United States Patent [19]

Takahashi

[11] Patent Number: 5,699,194
[45] Date of Patent: Dec. 16, 1997

[54] IMAGE DISPLAY APPARATUS COMPRISING AN INTERNALLY REFLECTING OCULAR OPTICAL SYSTEM

[75] Inventor: Koichi Takahashi, Hachioji, Japan

[73] Assignee: Olympus Optical Co., Ltd., Tokyo, Japan

[21] Appl. No.: 605,886

[22] Filed: Feb. 23, 1996

[30] Foreign Application Priority Data

Feb. 13, 1996 [JP] Japan ................. 8-025138

[51] Int. Cl.⁶ .................................................. G02B 27/14
[52] U.S. Cl. ........................................ 359/633; 359/630
[58] Field of Search ........................... 359/633, 630, 359/631, 639, 640; 345/7, 8

[56] References Cited

U.S. PATENT DOCUMENTS

| | | | |
|---|---|---|---|
| 3,923,370 | 12/1975 | Mostrom | 359/630 |
| 4,026,641 | 5/1977 | Bosserman et al. | 359/869 |
| 4,927,234 | 5/1990 | Banbury et al. | 359/630 |
| 5,134,521 | 7/1992 | Lacroix | 359/631 |
| 5,184,250 | 2/1993 | Lacroix | 359/631 |
| 5,249,081 | 9/1993 | Rogers | 359/633 |
| 5,257,094 | 10/1993 | LaRussa | 359/13 |
| 5,293,271 | 3/1994 | Merritt et al. | 359/858 |
| 5,369,415 | 11/1994 | Richard et al. | 345/6 |
| 5,453,877 | 9/1995 | Gerbe et al. | 359/633 |
| 5,459,612 | 10/1995 | Ingleton | 359/630 |
| 5,483,307 | 1/1996 | Anderson | 353/98 |
| 5,543,968 | 8/1996 | Freeman et al. | 359/631 |
| 5,585,967 | 12/1996 | Monroe | 359/629 |

FOREIGN PATENT DOCUMENTS

| | | |
|---|---|---|
| 365 406 | 4/1990 | European Pat. Off. . |
| 408 344 | 1/1991 | European Pat. Off. . |
| 460 983 | 12/1991 | European Pat. Off. . |
| 583 116 | 2/1994 | European Pat. Off. . |
| 3-101709 | 4/1991 | Japan . |
| 6-242393 | 9/1994 | Japan . |

*Primary Examiner*—David C. Nelms
*Assistant Examiner*—Ricky Mack
*Attorney, Agent, or Firm*—Cushman, Darby & Cushman IP Group of Pillsbury Madison & Sutro LLP

[57] ABSTRACT

An image display apparatus which enables observation of a clear image at a wide field angle with substantially no reduction in the brightness of the observation image, and which is extremely small in size and light in weight and hence unlikely to cause the observer to be fatigued. The image display apparatus includes an image display device and an ocular optical system for projecting an image formed by the image display device and for leading the projected image to an observer's eyeball. The ocular optical system (3) has three surfaces, and a space formed by the three surfaces is filled with a medium having a refractive index larger than 1. The three surfaces include, in the order in which light rays pass in backward ray tracing from the observer's eyeball (1) to the image display device (4), a first surface (5) which functions as both a refracting surface and an internally reflecting surface, a second surface (6) which is a reflecting surface facing the first surface (5) and decentered or tilted with respect to an observer's visual axis (2), and a third surface (7) which is a refracting surface closest to the image display device (4), so that reflection takes place three times in the path from the observer's eyeball (1) to the image display device (4).

34 Claims, 14 Drawing Sheets

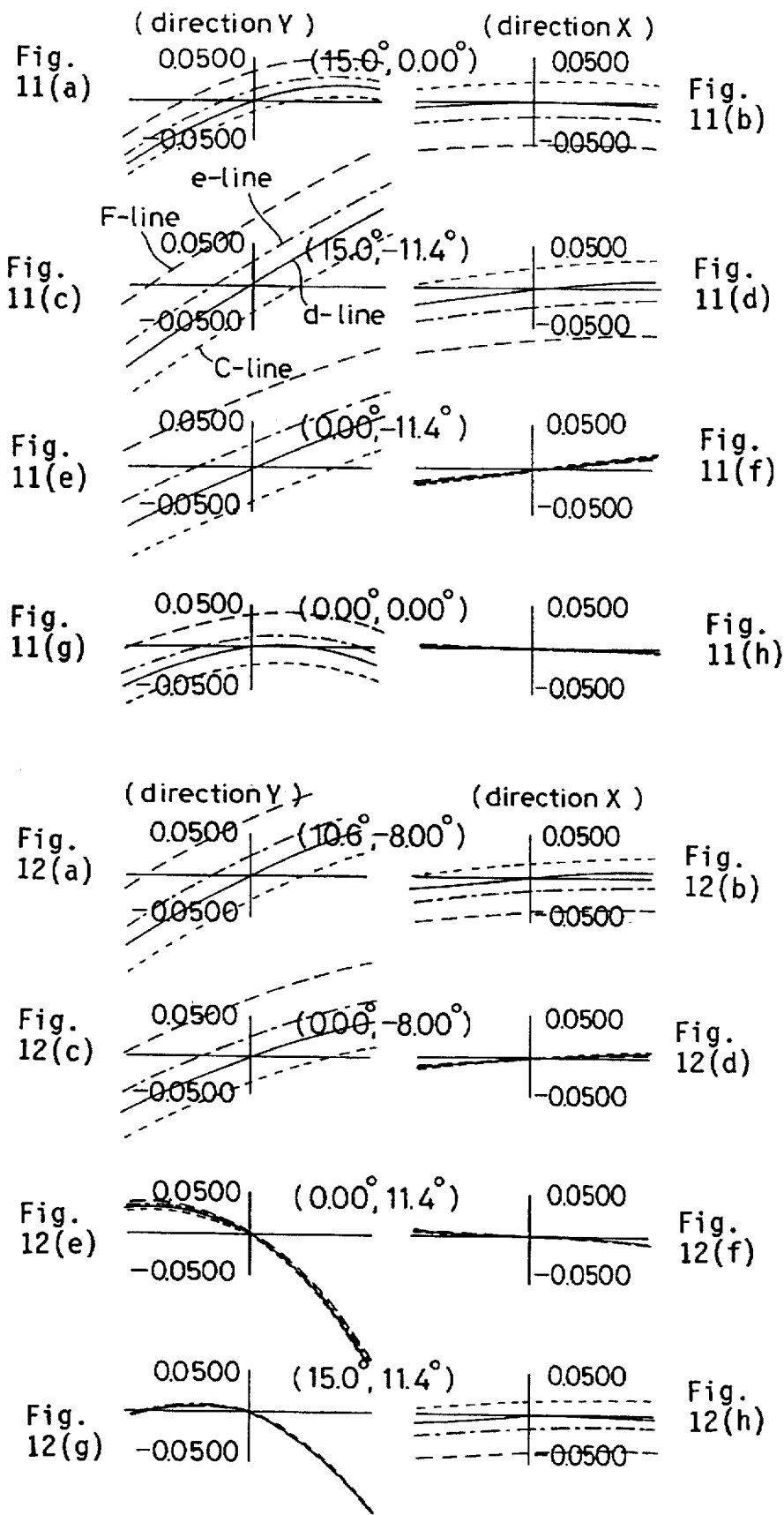

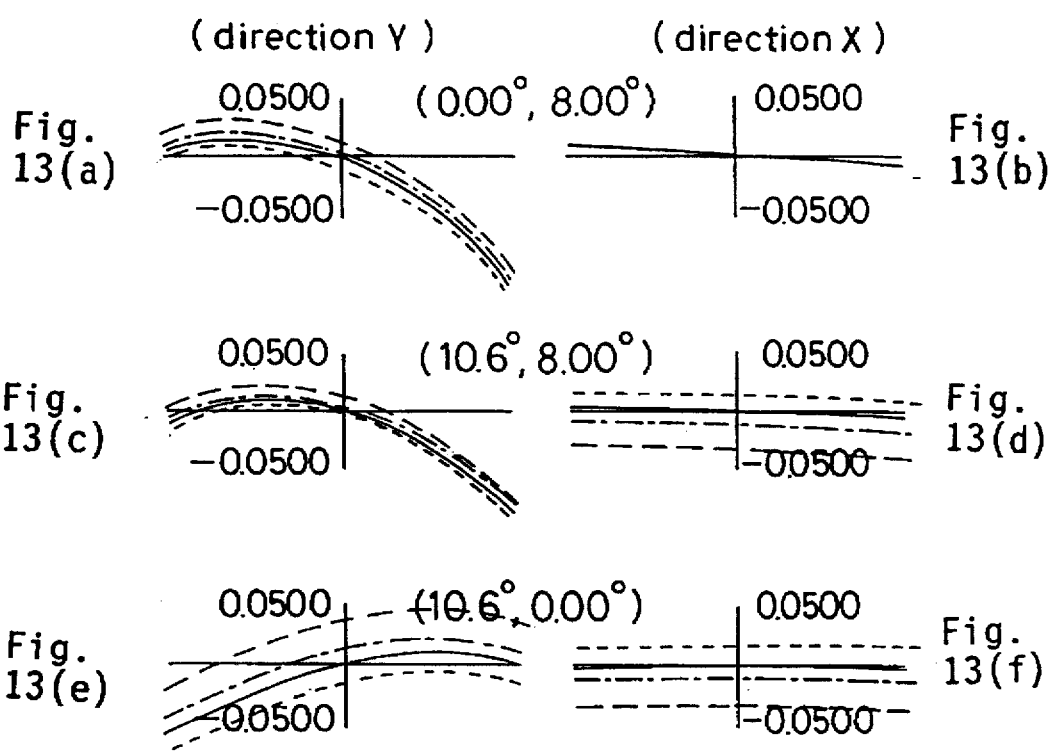

PRIOR ART
FIG. 20
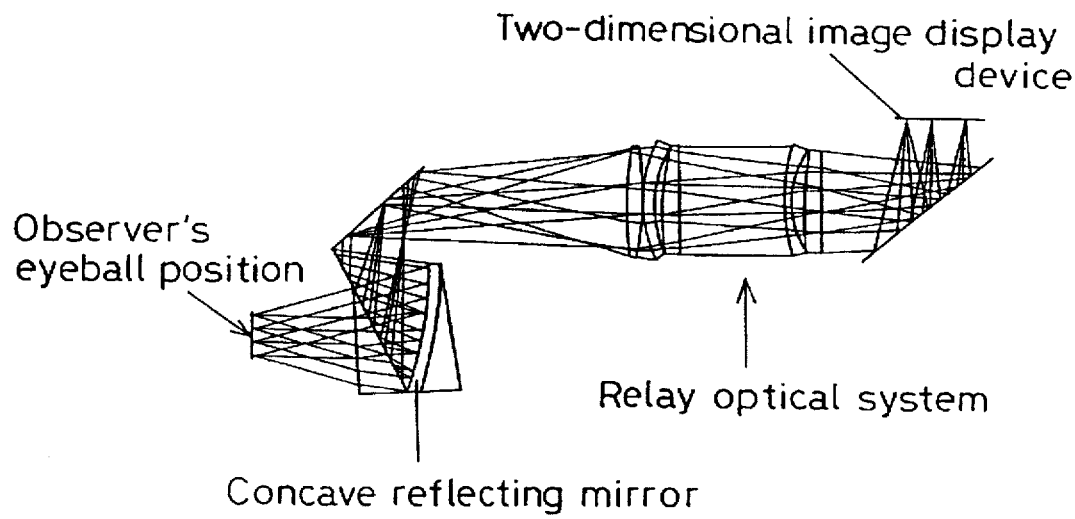
PRIOR ART
FIG. 21(a)
FIG. 21(b) PRIOR ART
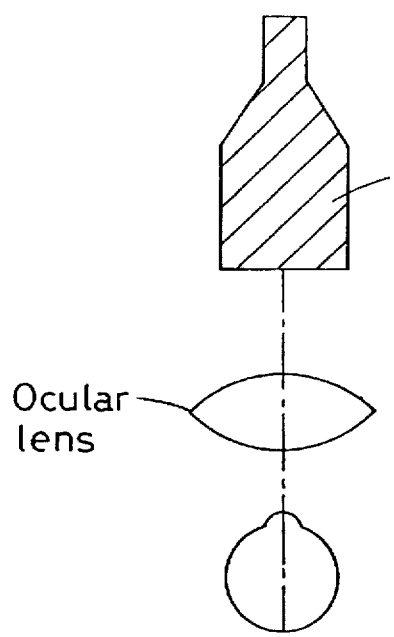
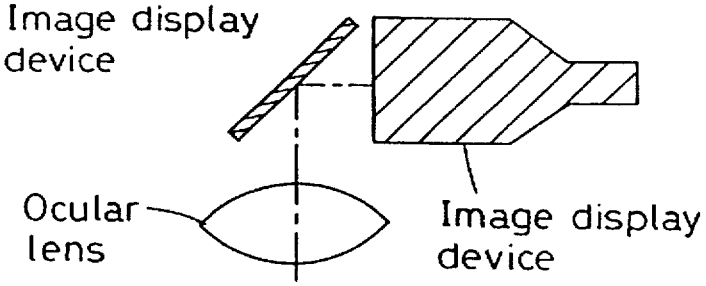

PRIOR ART
FIG. 22
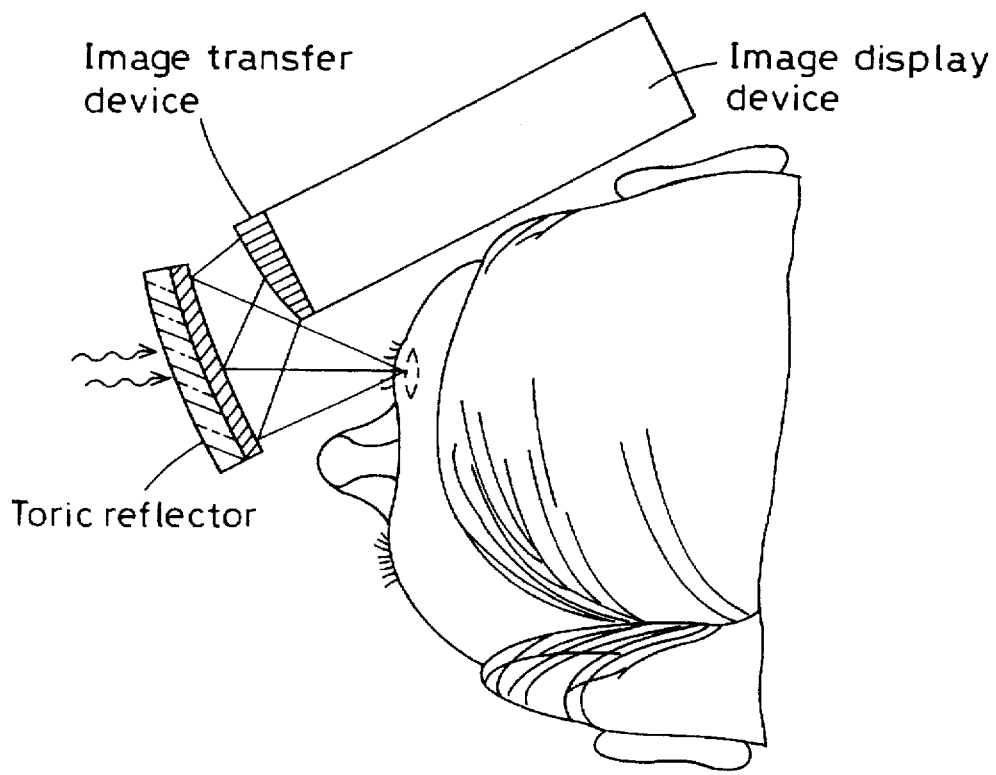
PRIOR ART FIG. 23
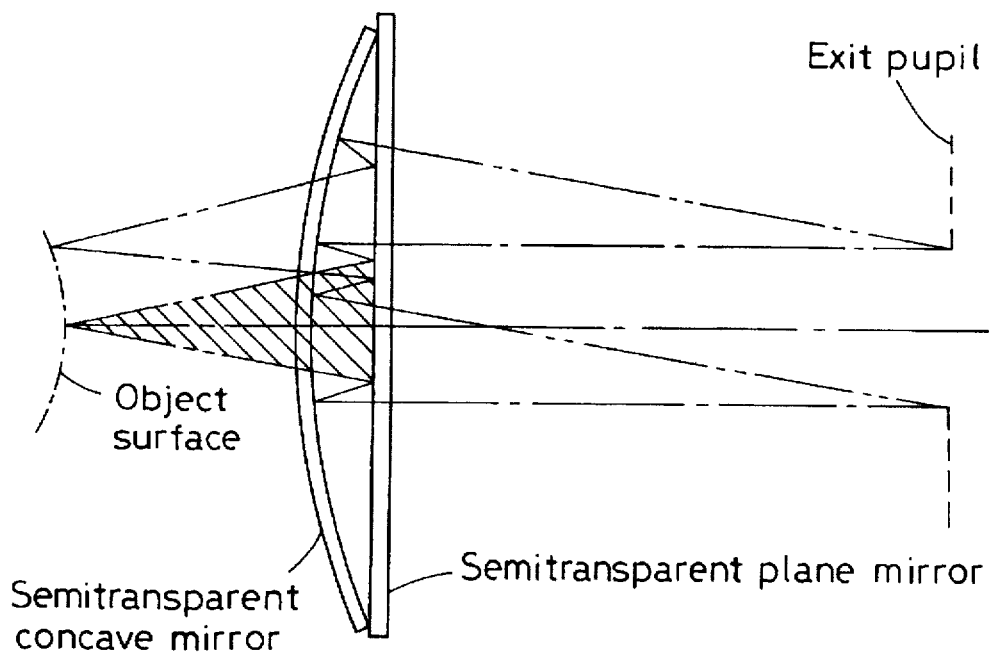

IMAGE DISPLAY APPARATUS COMPRISING AN INTERNALLY REFLECTING OCULAR OPTICAL SYSTEM

BACKGROUND OF THE INVENTION

The present invention relates to an image display apparatus and, more particularly, to a head- or face-mounted image display apparatus that can be retained on the observer's head or face.

As an example of conventional head- or face-mounted image display apparatus, an image display apparatus disclosed in Japanese Patent Application Unexamined Publication (KOKAI) No. 3-101709 (1991) is known. FIG. 20 shows the optical system of the conventional image display apparatus. As illustrated in the figure, in the conventional image display apparatus, an image that is displayed by an image display device is transmitted as an aerial image by a relay optical system including a positive lens, and the aerial image is projected into an observer's eyeball as an enlarged image by an ocular optical system formed from a concave reflecting mirror.

Japanese Patent Application Unexamined Publication (KOKAI) No. 62-214782 (1987) discloses another type of conventional image display apparatus. As shown in FIGS. 21(a) and 21(b), the conventional image display apparatus is designed to enable an image of an image display device to be directly observed as an enlarged image through an ocular lens.

U.S. Pat. No. 4,026,641 discloses another type of conventional image display apparatus. In the conventional image display apparatus, as shown in FIG. 22, an image of an image display device is transferred to a curved object surface by an image transfer device, and the image transferred to the object surface is projected in the air by a toric reflector.

U.S. Reissued Pat. No. 27,356 discloses another type of conventional image display apparatus. As shown in FIG. 23, the apparatus is an ocular optical system designed to project an object surface on an exit pupil by a semitransparent concave mirror and a semitransparent plane mirror.

However, an image display apparatus of the type in which an image of an image display device is relayed, as in the image display apparatus shown in FIG. 20, must use several lenses as a relay optical system in addition to an ocular optical system, regardless of the type of ocular optical system. Consequently, the optical path length increases, and the optical system increases in both size and weight.

In a layout such as that shown in FIGS. 21(a) and 21(b), the amount to which the apparatus projects from the observer's face undesirably increases. Further, since an image display device and an illumination optical system are attached to the projecting portion of the apparatus, the apparatus becomes increasingly large in size and heavy in weight.

Since a head-mounted image display apparatus is fitted to the human body, particularly the head, if the amount to which the apparatus projects from the user's face is large, the distance from the supporting point on the head to the center of gravity of the apparatus is long. Consequently, the weight of the apparatus is imbalanced when the apparatus is fitted to the observer's head. Further, when the observer moves or turns with the apparatus fitted to his/her head, the apparatus may collide with something.

That is, it is important for a head-mounted image display apparatus to be small in size and light in weight. An essential factor in determining the size and weight of the apparatus is the layout of the optical system.

However, if an ordinary magnifier alone is used as an ocular optical system, exceedingly large aberrations are produced, and there is no device for correcting them. Even if spherical aberration can be corrected to a certain extent by forming the configuration of the concave surface of the magnifier into an aspherical surface, other aberrations such as coma and field curvature remain. Therefore, if the field angle for observation is increased, the image display apparatus becomes impractical. Alternatively, if a concave mirror alone is used as an ocular optical system, it is necessary to use not only ordinary optical elements (lens and mirror) but also a device for correcting field curvature by an image transfer device (fiber plate) having a surface which is curved in conformity to the field curvature produced, as shown in FIG. 22.

In a coaxial ocular optical system in which an object surface is projected on an observer's pupil by using a semitransparent concave mirror and a semitransparent plane mirror, as shown in FIG. 23, since two semitransparent surfaces are used, the brightness of the image is reduced to as low a level as 1/16, even in the case of a theoretical value. Further, since field curvature that is produced by the semitransparent concave mirror is corrected by curving the object surface itself, it is difficult to use a flat display, e.g. an LCD (Liquid Crystal Display), as an image display device.

SUMMARY OF THE INVENTION

In view of the above-described problems of the conventional techniques, an object of the present invention is to provide an image display apparatus which enables observation of a clear image at a wide field angle with substantially no reduction in the brightness of the observation image, and which is extremely small in size and light in weight and hence unlikely to cause the observer to be fatigued.

To attain the above-described object, the present invention provides a first image display apparatus which includes an image display device for displaying an image, and an ocular optical system for projecting the image formed by the image display device and for leading the projected image to an observer's eyeball. The ocular optical system is arranged such that light rays emitted from the image display device are reflected three or higher odd-numbered times before reaching the observer's eyeball, and that a surface of the ocular optical system that is disposed immediately in front of the observer's eyeball is a refracting surface which internally reflects the light rays, and through which the light rays exit from the ocular optical system.

In addition, the present invention provides a second image display apparatus which includes an image display device for displaying an image, and an ocular optical system for projecting the image formed by the image display device and for leading the projected image to an observer's eyeball. The ocular optical system is arranged such that light rays emitted from the image display device are reflected three times before reaching the observer's eyeball, and that a surface of the ocular optical system that is disposed immediately in front of the observer's eyeball is a refracting surface which internally reflects the light rays, and through which the light rays exit from the ocular optical system.

In addition, the present invention provides a third image display apparatus which includes an image display device for displaying an image, and an ocular optical system for projecting the image formed by the image display device and for leading the projected image to an observer's eyeball.

The ocular optical system has at least three surfaces, and a space formed by the at least three surfaces is filled with a medium having a refractive index larger than 1. The at least three surfaces include, in the order in which light rays pass in backward ray tracing from the observer's eyeball to the image display device, a first surface which functions as both a refracting surface and an internally reflecting surface, a second surface which is a reflecting surface facing the first surface and decentered or tilted with respect to an observer's visual axis, and a third surface which is a refracting surface closest to the image display device, so that reflection takes place three times in the path from the observer's eyeball to the image display device.

In addition, the present invention provides a fourth image display apparatus which includes an image display device for displaying an image, and an ocular optical system for projecting the image formed by the image display device and for leading the projected image to an observer's eyeball. The ocular optical system has at least four surfaces, and a space formed by the at least four surfaces is filled with a medium having a refractive index larger than 1. The at least four surfaces include, in the order in which light rays pass in backward ray tracing from the observer's eyeball to the image display device, a first surface which functions as both a refracting surface and an internally reflecting surface, a second surface which is a reflecting surface facing the first surface and decentered or tilted with respect to an observer's visual axis, a third surface which is a reflecting surface facing the first surface and adjacent to the second surface, and a fourth surface which is a refracting surface closest to the image display device, so that reflection takes place three times in the path from the observer's eyeball to the image display device.

The reasons for adopting the above-described arrangements in the present invention, together with the functions and effects thereof, will be explained below. The following explanation will be made on the basis of backward ray tracing in which light rays are traced from the observer's pupil position toward the image display device for the convenience of designing the optical system.

In the first image display apparatus according to the present invention, the ocular optical system is characterized in that light rays emitted from the image display device are reflected three or higher odd-numbered times before reaching the observer's eyeball, and that a surface of the ocular optical system that is disposed immediately in front of the observer's eyeball is a refracting surface which internally reflects the light rays, and through which the light rays exit from the ocular optical system. Examples 1 to 10 (described later) correspond to the arrangement of the first image display apparatus.

In this apparatus, light rays emitted from the image display device are reflected at least three times in the ocular optical system, thereby enabling the light rays to be folded very effectively and favorably, and thus succeeding in minimizing the thickness of the ocular optical system and realizing reduction in both size and weight of the image display apparatus. In addition, because light rays emitted from the image display device are reflected an odd number of times, the image display device can be installed in such a manner that a side thereof which is reverse to its display surface faces the observer. Further, in the case of an image display device which is illuminated from behind it, e.g. an LCD (Liquid Crystal Display), a back light and other attachments are disposed behind the image display device. In this regard, the present invention enables these attachments to be disposed along the observer's face. Accordingly, no part of the image display device projects forwardly beyond the ocular optical system. In other words, the whole image display apparatus can be arranged such that the amount to which the optical system projects from the observer's face is extremely small. Thus, a compact and lightweight head-mounted image display apparatus can be realized.

Further, a surface of the ocular optical system that is disposed immediately in front of the observer's face is adapted to perform both refraction and reflection. Therefore, it is possible to reduce the number of surfaces needed to constitute the ocular optical system and hence possible to improve productivity. In addition, if the angle of internal reflection at the first surface is set so as to be larger than the critical angle, it becomes unnecessary to provide the first surface with a reflective coating. Therefore, even if the transmitting and reflecting regions on the first surface overlap each other, the image of the image display device reaches the observer's eyeball without any problem. Accordingly, the ocular optical system can be arranged in a compact form, and the field angle for observation can be widened.

In the second image display apparatus according to the present invention, the ocular optical system is characterized in that light rays emitted from the image display device are reflected three times before reaching the observer's eyeball, and that a surface of the ocular optical system that is disposed immediately in front of the observer's eyeball is a refracting surface which internally reflects the light rays, and through which the light rays exit from the ocular optical system. Examples 1 to 10 (described later) correspond to the arrangement of the second image display apparatus.

In this apparatus, light rays emitted from the image display device are reflected three times in the ocular optical system, thereby enabling the light rays to be folded very effectively and favorably, and thus succeeding in minimizing the thickness of the ocular optical system and realizing reduction in both size and weight of the image display apparatus. Light rays emanating from the observer's pupil is first reflected toward the observer's face. Then, by the second reflection, the light rays are reflected forwardly from the observer's face side. By the third reflection, the light rays are reflected toward the observer's face again to reach the image display device. Therefore, the image display device lies closer to the observer, and the image display device can be disposed in such a manner that a side thereof which is reverse to its display surface faces the observer. Accordingly, it is possible to realize a head-mounted image display apparatus which projects from the observer's face to an extremely small amount for the same reasons as set forth above with respect to the second image display apparatus according to the present invention. Although it is possible to obtain similar advantageous effects by arranging the ocular optical system such that the light rays are reflected five or higher odd-numbered times, an increase in the number of reflections causes the distance from the image display device to the observer's pupil position to lengthen exceedingly. Consequently, it becomes necessary to use longer and larger optical elements. Further, it becomes difficult to ensure a wide field angle because the focal length of the ocular optical system becomes long. Accordingly, the use of the ocular optical system which allows the image of the image display device to reach the observer's eyeball by three reflections makes it possible to realize a well-balanced image display apparatus.

Further, a surface of the ocular optical system that is disposed immediately in front of the observer's face is adapted to perform both refraction and reflection. Therefore, it is possible to reduce the number of surfaces needed to form the ocular optical system and hence possible to improve productivity. In addition, if the angle of internal reflection at the first surface is set so as to be larger than the critical angle, it becomes unnecessary to provide the first surface with a reflective coating. Therefore, even if the transmitting and reflecting regions on the first surface overlap each other, the image of the image display device reaches the observer's eyeball without any problem. Accordingly, the ocular optical system can be arranged in a compact form, and the field angle for observation can be widened.

In the third image display apparatus according to the present invention, the ocular optical system has at least three surfaces, and a space formed by the at least three surfaces is filled with a medium having a refractive index larger than 1. The at least three surfaces include, in the order in which light rays pass in backward ray tracing from the observer's eyeball to the image display device, a first surface which functions as both a refracting surface and an internally reflecting surface, a second surface which is a reflecting surface facing the first surface and decentered or tilted with respect to an observer's visual axis, and a third surface which is a refracting surface closest to the image display device, so that reflection takes place three times in the path from the observer's eyeball to the image display device. Examples 1 to 5 (described later) correspond to the arrangement of the third image display apparatus.

In this apparatus, a space that is formed by the first, second and third surfaces of the ocular optical system is filled with a medium having a refractive index larger than 1, and light rays emitted from the image display device are reflected three times in the ocular optical system, thereby enabling the light rays to be folded very effectively and favorably, and thus succeeding in minimizing the thickness of the ocular optical system, realizing reduction in both size and weight of the image display apparatus, and providing the observer with a clear observation image having a wide exit pupil diameter and a wide field angle.

By filling the space formed by the first, second and third surfaces with a medium having a refractive index larger than 1, light rays from the pupil are refracted by the first surface, and it is therefore possible to minimize the height at which extra-axial principal and subordinate rays are incident on the second surface. Consequently, the height of the principal ray at the second surface is low, and therefore, the size of the second surface is minimized. Thus, the ocular optical system can be formed in a compact structure. Alternatively, the field angle can be widened. Further, because the height of the subordinate rays is reduced, it is possible to minimize comatic aberrations produced by the second surface, particularly higher-order comatic aberrations.

Further, the actual optical path length is equal to the product of the apparent optical path length multiplied by the refractive index (e.g. 1.5) of the medium. Therefore, it become easy to ensure the distance from the observer's eyeball to the ocular optical system, or the distance from the ocular optical system to the image display device.

Further, unlike a conventional arrangement in which an observation image of an image display device is formed in the air as a real intermediate image by a relay optical system and projected into an eyeball as an enlarged image by an ocular optical system, the image display apparatus according to the present invention is arranged to project the image of the image display device directly into an observer's eyeball as an enlarged image, thereby enabling the observer to see the enlarged image of the image display device as a virtual image. Accordingly, the optical system can be formed from a relatively small number of optical elements. Further, because the second surface of the ocular optical system, which is a reflecting surface, can be disposed immediately in front of the observer's face in a configuration conformable to the curve of his/her face, the amount to which the optical system projects from the observer's face can be reduced to an extremely small value. Thus, a compact and lightweight image display apparatus can be realized.

Further, because the ocular optical system comprises as small a number of surfaces as three, the mechanical design is facilitated, and the arrangement of the optical system is superior in productivity in the process of machining optical elements. Thus, it is possible to realize an optical system of low cost and high productivity.

In the fourth image display apparatus, the ocular optical system has at least four surfaces, and a space formed by the at least four surfaces is filled with a medium having a refractive index larger than 1. The at least four surfaces include, in the order in which light rays pass in backward ray tracing from the observer's eyeball to the image display device, a first surface which functions as both a refracting surface and an internally reflecting surface, a second surface which is a reflecting surface facing the first surface and decentered or tilted with respect to an observer's visual axis, a third surface which is a reflecting surface facing the first surface and adjacent to the second surface, and a fourth surface which is a refracting surface closest to the image display device, so that reflection takes place three times in the path from the observer's eyeball to the image display device. Examples 6 to 10 (described later) correspond to the arrangement of the fourth image display apparatus.

In this apparatus, light rays emitted from the image display device are reflected three times in the ocular optical system in the same way as in the third image display apparatus, thereby enabling the light rays to be folded very effectively and favorably, and thus succeeding in minimizing the thickness of the ocular optical system, realizing reduction in both size and weight of the image display apparatus, and providing the observer with a clear observation image having a wide exit pupil diameter and a wide field angle.

In the fourth image display apparatus, because the ocular optical system comprises four surfaces, only the first surface performs both transmission and reflection, and other reflecting and refracting functions are performed by respective surfaces which are independent of each other. Accordingly, these surfaces can correct each other's aberrations, and hence the arrangement is remarkably useful for aberration correction.

In a case where, as shown in FIG. 6, the image display device 4 is disposed above the observer's face or at a side of the observer's face, the image display device 4 is disposed obliquely in front of the fourth surface 14, which is in close proximity to the image display device 4, thereby enabling the whole apparatus to be arranged in a structure which is compact and will not interfere with the observer's face. In the image display apparatus according to the present invention in which the ocular optical system comprises three surfaces, light rays are reflected twice by the second surface. Accordingly, if the radius of curvature of the second surface is reduced, the image display device is likely to be disposed closer to the observer's face. When an LCD is used as an image display device in particular, a back light, driving substrate, etc. undesirably project. Therefore, the apparatus is likely to interfere with the observer's face. If the radius of curvature of the second surface is increased, the distance between two points on the second surface at which two reflections take place, respectively, increases, and hence the second surface increases in length. Consequently, the first surface also increases in length, causing the optical system itself to increase in size unfavorably.

In contrast, the ocular optical system which comprises four surfaces is free from the above-described problem. That is, in the fourth image display apparatus, the function of the second surface in the triple surface structure is divided between the second and fourth surfaces. Accordingly, there are two surfaces which are disposed opposite to the observer's face to reflect light rays toward the observer. Therefore, it is possible to reflect an optical path by each of the second and fourth surfaces in a favorable direction without depending on the curvature of each surface. In other words, it is possible to arrange the optical system in a compact form and set the apparatus in a favorable direction without causing the image display device 4 to interfere with the observer's face.

In the above-described image display apparatuses, at least one of the surfaces constituting the ocular optical system may be a flat surface. Examples 5 and 6 (described later) correspond to this arrangement.

That is, if at least one surface of the ocular optical system is a flat surface, the other surfaces can be defined with the flat surface used as a reference; this facilitates the mechanical design and production of the ocular optical system. Thus, it also becomes possible to shorten the machining time and readily arrange the layout of the whole apparatus. Accordingly, it is possible to realize a considerable cost reduction.

In the third and fourth image display apparatuses, it is desirable that the internal reflection at the first surface should be total reflection. Examples, 1, 2, 3, 6, 7 and 8 (described later) correspond to this arrangement.

That is, if the light rays reflected by the second surface are totally reflected by the first surface, it is possible to obtain great advantages in terms of the size of the optical elements and from the viewpoint of performance. This will be explained below in detail.

FIGS. 14(a) and 14(b) are sectional views each illustrating an optical ray trace of the image display apparatus according to the present invention. FIG. 14(a) shows an ocular optical system in which a first surface 5 does not totally reflect light rays. FIG. 14(b) shows an ocular optical system in which total reflection occurs at a first surface 5. In these sectional views, reference numeral 1 denotes an observer's pupil position, 2 an observer's visual axis, 3 an ocular optical system, 4 an image display device, 5 a first surface of the ocular optical system 3, 6 a second surface of the ocular optical system 3, and 7 a third surface of the ocular optical system 3. In FIG. 14(a), an internally reflecting region M of the first surface 5 has been mirror-coated. The other region of the first surface 5 is a refracting region.

Light rays coming out of the pupil 1 are refracted by the first surface 5 of the ocular optical system 3, reflected by the second surface 6, which is a concave mirror, and internally reflected by the first surface 5. If, as shown in FIG. 14(a), there is a large difference between the height at which upper extra-axial light rays U are reflected by the second surface 6 and the height at which the upper extra-axial light rays U are reflected by the first surface 5 after being reflected by the second surface 6, the overall length of the ocular optical system 3 correspondingly increases, resulting in an increase of the overall size of the ocular optical system 3. That is, as the difference between the heights of the reflection points decreases, the size of the ocular optical system 3 can be made smaller. In other words, if the size of the ocular optical system is kept constant, as the difference between the heights of the reflection points becomes smaller, the field angle for observation can be widened.

However, if the difference between the reflection heights of the upper extra-axial light rays U at the second surface 6 and the first surface 5 is reduced in the ocular optical system of the present invention, as shown in FIG. 14(b), the upper light rays U are reflected at a position higher than a position at which lower extra-axial light rays L are incident on the first surface 5. Accordingly, when the first surface 5 is not a totally reflecting surface, the refracting region of the first surface 5 overlaps the mirror coat region M'. Consequently, the lower light rays L are undesirably blocked.

That is, if the internal reflection at the first surface 5 satisfies the condition for total reflection, the first surface 5 need not be mirror-coated. Therefore, even if the upper light rays U after reflection at the second surface 6 and the lower light rays L incident on the first surface 5 interfere with each other at the first surface 5, the upper and lower light rays U and L can perform their original functions. At the second surface 6, which is a decentered reflecting surface, as the reflection angle becomes larger, comatic aberration occurs to a larger extent. However, in a case where light rays are totally reflected by the first surface 5, the angle of reflection at the second surface 6 can be reduced. Therefore, it is possible to effectively suppress the occurrence of comatic aberration at the second surface 6.

It should be noted that the above-described effect does not depend on the number of surfaces constituting the ocular optical system.

Further, it is desirable that the second surface should be arranged as a reflecting surface which is concave toward the first surface. Examples, 1, 2, 3, 4, 6, 7 and 8 (described later) correspond to this arrangement.

In a case where the second surface is a reflecting surface which is concave toward the first surface, the second surface is a principal reflecting surface having a positive power in the ocular optical system. Principal rays diverging from the pupil at a certain angle (field angle) are reflected by the second surface having a positive power, thereby enabling the angle to be reduced. Accordingly, it is possible to reduce the size of all the surfaces, from the first to third surfaces after the reflection at the second surface, and hence possible to arrange the whole optical system in a compact and light-weight structure.

Generally, a concave mirror which is decentered with respect to an optical axis causes axial and off-axis comatic aberrations to be produced by decentration. Further, as the power of a surface increases, the amount of aberration produced by the surface also increases. However, in the ocular optical system according to the present invention, light rays are reflected twice by the second surface. Therefore, it is possible to obtain an adequate positive power for the whole system without the need to increase the power of the second surface. Accordingly, it is possible to minimize the amount of aberration produced by each reflection at the second surface.

Further, it is desirable that the first surface should be a surface which functions as both a transmitting surface and a reflecting surface, and which is convex toward the second surface. Examples 1, 2, 3, 4, 7 and 8 (described later) correspond to this arrangement.

In a case where the first surface functions as both a transmitting surface and a reflecting surface and is convex toward the second surface, and the second surface has a positive power, it is possible to effectively correct coma and field curvature produced by the second surface when light rays are internally reflected by the first surface after being reflected by the second surface.

In a case where the second surface is a reflecting surface having a positive power, the negative comatic aberration produced by the second surface can be corrected by allowing the first surface to have a negative power so that the first surface produces comatic aberration which is opposite in sign to the comatic aberration produced by the second surface. The positive field curvature produced by the second surface can be simultaneously corrected by producing negative field curvature at the first surface.

In order to allow the first surface to perform total reflection as internal reflection, it is necessary to satisfy the condition that reflection angles of all light rays at the first surface are not smaller than the critical angle $\theta_r = \sin^{-1}(1/n)$ (where n is the refractive index of a medium constituting the optical system). In the case of n=1.5, for example, $\theta_r = 41.81°$, and a reflection angle not smaller than it is necessary. This will be explained below with reference to FIGS. 15(a) and 15(b). FIGS. 15(a) and 15(b) show a part of the ocular optical system in which light rays are first reflected by the second surface 6 and then internally reflected by the first surface 5. FIG. 15(a) shows the way in which reflection takes place when the first surface 5 is concave toward the second surface 6. FIG. 15(b) shows the way in which reflection takes place when the first surface 5 is convex toward the second surface 6.

After being reflected by the second surface 6, each light ray is directed downward at a certain reflection angle. In a case where the first surface 5 is a reflecting surface which is concave toward the second surface 6, as shown in FIG. 15(a), lines S normal to the first surface 5 convergently extend toward the second surface 6. Since a lower light ray L reflected by the second surface 6 is incident on the first surface 5 in a direction along the line normal to the first surface 5, the reflection angle γ at the first surface 5 cannot be made large. That is, it is difficult to satisfy the condition for total reflection with respect to all light rays reflected by the first surface 5. Conversely, in a case where the first surface 5 is convex toward the second surface 6, as shown in FIG. 15(b), lines S' normal to the first surface 5 divergently extend toward the second surface 6. Accordingly, the reflection angle γ' can be effectively increased even for the lower light ray. Thus, the condition for total reflection at the first surface 5 can be readily satisfied at a wide field angle.

Further, the first surface may be a flat surface which functions as both a transmitting surface and a reflecting surface. Example 6 (described later) corresponds to this arrangement.

If the first surface is a flat surface, the other surfaces can be defined with the flat surface used as a reference; this facilitates the mechanical design and production of the ocular optical system. Thus, it also becomes possible to shorten the machining time and readily arrange the layout of the whole apparatus. Accordingly, it is possible to realize a considerable cost reduction. Further, when an outside world image is to be observed through the ocular optical system, it is necessary to arrange the system such that a compensating optical system for viewing the outside world is disposed outside the second surface so that the power of the entire optical system is approximately zero with respect to light from the outside world. In such a case, if the first surface is a flat surface, both the entrance and exit surfaces of the optical system are flat surfaces. Therefore, even if the first surface is tilted, the outside world can be readily observed. If the compensating optical system is cemented to the second surface, the resulting structure is a simple plane-parallel plate with respect to the outside world light and hence completely powerless. That is, the magnification is 1. Thus, the outside world can be observed in a natural state.

Further, the internally reflecting region of the first surface may be provided with a reflective coating. Examples 4, 5, 9 and 10 (described later) correspond to this arrangement.

When the internal reflection at the first surface does not satisfy the condition for total reflection, the internally reflecting region of the first surface needs to be provided with a reflective coating of aluminum, for example.

Further, the first surface may be a surface which functions as both a transmitting surface and a reflecting surface, and which is concave toward the second surface. Examples 5, 9 and 10 (described later) correspond to this arrangement.

In a case where the first surface has a positive power, light rays are refracted by the first surface even more effectively. Therefore, it is possible to further reduce the height at which light rays are incident on the second surface. This action makes it possible to reduce the amount of comatic aberration produced by decentration at the second and later reflecting surfaces.

Further, the second surface may be a reflecting surface which is convex toward the first surface. Examples 9 and 10 (described later) correspond to this arrangement.

In a case where the first surface has a positive power, the second surface must have a negative power in order to ensure an optical path length required for the optical system. In the case of an ocular optical system having a wide field angle as in the present invention, the optical system can be arranged in a compact structure by placing a positive power at a position close to the exit pupil. However, the first surface not only refracts but also reflects light rays after they have been reflected by the second surface. With respect to surfaces of the same curvature, reflective power is stronger than refractive power. In other words, the focal length becomes exceedingly short. Therefore, an appropriate focal length is obtained by giving a negative power to the second surface, thus enabling the image display device to be readily disposed at a predetermined position.

Further, it is desirable to satisfy the following condition:

$$0° < \theta_2 < 50° \quad (1)$$

where $\theta_2$ is the incident angle of the axial principal ray at the first reflection by the second surface in the backward ray tracing.

Examples 1 to 10 (described later) correspond to this arrangement.

FIG. 16 shows the way in which, in the ocular optical system 3 in the image display apparatus according to the present invention, an axial principal ray, which exits from the center of the pupil 1 and reaches the center of the image display device 4, emits from the image display device 4 and reaches the observer's pupil 1, together with incident angles $\theta_1$ to $\theta_5$ set at the surfaces 4 to 7 and $\theta_i$. The sign of each angle is positive when the angle is determined in the direction illustrated in FIG. 16 from the perpendicular S at the reflection point.

The above expression (1) is a condition for disposing the ocular optical system and the image display device in the image display apparatus according to the present invention at appropriate positions, respectively. If the incident angle $\theta_2$ is not larger than the lower limit of the condition (1), i.e. 0°, light rays reflected by the second surface undesirably return to the observer, making it impossible to perform observation. Conversely, if the incident angle $\theta_2$ is not smaller than the upper limit, i.e. 50°, the distance to the reflection point on the first surface increases, causing the second surface to lengthen. Consequently, the optical system becomes undesirably large in size.

Further, it is preferable to satisfy the following condition:

$$10° < \theta_2 < 40° \quad (2)$$

where $\theta_2$ is the incident angle of the axial principal ray at the first reflection by the second surface in the backward ray tracing.

Examples 1 to 10 (described later) correspond to this arrangement.

The above expression (2) is a condition for disposing the ocular optical system and the image display device in the image display apparatus according to the present invention at appropriate positions, respectively. If the incident angle $\theta_2$ is not larger than the lower limit of the condition (2), i.e. 10°, the angle of incidence on the first surface of the light rays reflected from the second surface cannot satisfy the condition for the critical angle in a case where the light rays are totally reflected by the second surface. As a result, the light rays undesirably return to the observer through the optical system, making it impossible to perform observation. Conversely, if $\theta_2$ is not smaller than the upper limit, i.e. 40°, the reflection angle becomes undesirably large, causing comatic aberration to be produced by decentration to such an extent that it cannot satisfactorily be corrected by another surface. Consequently, it becomes difficult to observe a sharp image.

Further, it is desirable to satisfy the following condition:

$$-20° < \theta_1 < 40° \quad (3)$$

where $\theta_1$ is the incident angle of the axial principal ray at the first surface.

Examples 1 to 10 (described later) correspond to this arrangement.

The above expression (3) is a condition for disposing the ocular optical system in the image display apparatus according to the present invention at an appropriate position or at an appropriate angle. If the $\theta_1$ is not larger than the lower limit of the condition (3), i.e. -20°, the ocular optical system undesirably bows toward the observer. Therefore, the apparatus is likely to interfere with the observer's head. Conversely, if $\theta_1$ is not smaller than the upper limit, i.e. 40°, the ocular optical system undesirably projects forwardly, resulting in an apparatus of body weight balance.

Further, it is preferable to satisfy the following condition:

$$-10° < \theta_1 < 25° \quad (4)$$

where $\theta_1$ is the incident angle of the axial principal ray at the first surface.

Examples 1 to 10 (described later) correspond to this arrangement.

The above expression (4) is a condition for disposing the ocular optical system in the image display apparatus according to the present invention at an appropriate position or at an appropriate angle. If the $\theta_1$ is not larger than the lower limit of the condition (4), i.e. -10°, the ocular optical system undesirably bows toward the observer. Therefore, the apparatus is likely to interfere with the observer's head.

Conversely, if $\theta_1$ is not smaller than the upper limit, i.e. 25°, the amount of chromatic aberration produced by the first surface increases. Particularly, off-axis lateral chromatic aberration markedly appears, making it difficult to observe a sharp image.

Further, it is desirable to satisfy the following condition:

$$20° < \theta_3 < 70° \quad (5)$$

where $\theta_3$ is the incident angle of the axial principal ray at the internal reflection by the first surface.

Examples 1 to 10 (described later) correspond to this arrangement.

The above expression (5) is a condition for arranging the ocular optical system in the image display apparatus according to the present invention in a structure which is compact and lightweight and yet enables observation. If $\theta_3$ is not larger than the lower limit of the condition (5), i.e. 20°, the light rays internally reflected by the first surface return to the second surface and are then reflected by the first surface to return to the observer's face, making it impossible to perform observation. If $\theta_3$ is not smaller than the upper limit, i.e. 70°, a position at which light rays reach the second or third (in the case of the ocular optical system comprising four surfaces) after being reflected by the first surface is undesirably far away from the reflection point. Consequently, the optical system undesirably increases in size.

Further, it is preferable to satisfy the following condition:

$$30° < \theta_3 < 55° \quad (6)$$

where $\theta_3$ is the incident angle of the axial principal ray at the internal reflection by the first surface.

Examples 1 to 10 (described later) correspond to this arrangement.

The above expression (6) is a condition for arranging the ocular optical system in the image display apparatus according to the present invention in a structure which is compact and lightweight and yet enables observation. If $\theta_3$ is not larger than the lower limit of the condition (6), i.e. 30°, it becomes difficult to satisfy the condition for the critical angle at the first surface, and it becomes impossible to perform observation. Conversely, if $\theta_3$ is not smaller than the upper limit, i.e. 55°, a position at which light rays reach the second or third (in the case of the ocular optical system comprising four surfaces) after being reflected by the first surface is undesirably far away from the reflection point. Consequently, the optical system undesirably increases in size.

Further, it is desirable to satisfy the following condition:

$$20° < \theta_4 < 80° \quad (7)$$

where $\theta_4$ is the incident angle of the axial principal ray when reflected for a second time in the backward ray tracing by the second surface of the ocular optical system comprising three surfaces, or $\theta_4$ is the incident angle of the axial principal ray at the third surface of the ocular optical system comprising four surfaces.

Examples 1 to 10 (described later) correspond to this arrangement.

The above expression (7) is a condition for enabling the observer to view the image of the image display device clearly over the length and breadth of it through the ocular optical system of the image display apparatus according to the present invention. If $\theta_4$ is not larger than the lower limit of the condition (7), i.e. 20°, light rays undesirably return to the first surface. Therefore, the reflected light rays undesirably reach the observer's face, making it impossible to perform observation. Conversely, if $\theta_4$ is not smaller than the upper limit, i.e. 80°, the distance from the internal reflection point on the first surface becomes exceedingly long, causing the optical system to lengthen downward as viewed in FIG. 16. As a result, the optical system becomes undesirably large in size.

Further, it is preferable to satisfy the following condition:

$$30°<\theta_4<65° \quad (8)$$

where $\theta_4$ is the incident angle of the axial principal ray when reflected for a second time in the backward ray tracing by the second surface of the ocular optical system comprising three surfaces, or $\theta_4$ is the incident angle of the axial principal ray at the third surface of the ocular optical system comprising four surfaces.

Examples 1 to 10 (described later) correspond to this arrangement.

The above expression (8) is a condition for enabling the observer to view the image of the image display device clearly over the length and breadth of it through the ocular optical system of the image display apparatus according to the present invention. If $\theta_4$ is not larger than the lower limit of the condition (8), i.e. 30°, light rays are reflected in a direction closer to the pupil direction (i.e. in an upward direction as viewed in FIG. 16), causing extra-axial light rays to interfere with the first surface when the reflected light rays reach the third surface or the fourth surface (in the case of the ocular optical system comprising four surfaces). Thus, it becomes difficult to observe the image clearly over the length and breadth of it. Conversely, if $\theta_4$ is not smaller than the upper limit, i.e. 65°, the angle of reflection at the second or third surface becomes excessively large, causing comatic aberration to be produced by decentration to such an extent that it cannot satisfactorily be corrected by another surface. Consequently, it becomes difficult to observe a sharp image.

Further, it is desirable to satisfy the following condition:

$$-30°<\theta_5<40° \quad (9)$$

where $\theta_5$ is the incident angle of the axial principal ray at the third surface in the ocular optical system comprising three surfaces, or $\theta_5$ is the incident angle of the axial principal ray at the fourth surface in the ocular optical system comprising four surfaces.

Examples 1 to 10 (described later) correspond to this arrangement.

The above expression (9) is a condition for disposing the ocular optical system and the image display device in the image display apparatus according to the present invention at appropriate positions, respectively. If $\theta_5$ is not larger than the lower limit of the condition (9), i.e. -30°, light rays are refracted in a direction away from the pupil direction (i.e. in a downward direction as viewed in FIG. 16), causing the image display device to come away from the pupil. Consequently, the overall size of the apparatus increases undesirably. Conversely, if $\theta_5$ is not smaller than the upper limit, i.e. 40°, light rays are reflected in a direction closer to the pupil direction (i.e. in an upward direction as viewed in FIG. 16). Consequently, the image display device is disposed closer to the observer's face. Thus, it becomes likely that the image display device will interfere with the observer's face.

Further, it is desirable to satisfy the following condition:

$$-40°<\theta_i<40° \quad (10)$$

where $\theta_i$ is the incident angle of the axial principal ray at the display surface of the image display device.

Examples 1 to 10 (described later) correspond to this arrangement.

The above expression (10) is a condition for enabling the observer to view the image of the image display device clearly over the length and breadth of it through the ocular optical system of the image display apparatus according to the present invention. If $\theta_i$ is not larger than the lower limit of the condition (10), i.e. -40°, or not smaller than the upper limit of the condition (10), i.e. 40°, light emitted from the image display device cannot sufficiently be supplied to the observer's pupil. Hence, it becomes difficult to observe a bright and clear image.

Further, it is preferable to satisfy the following condition:

$$-25°<\theta_i<25° \quad (11)$$

where $\theta_i$ is the incident angle of the axial principal ray at the display surface of the image display device.

Examples 1 to 10 (described later) correspond to this arrangement.

The above expression (11) is a condition for enabling the observer to view the image of the image display device clearly over the length and breadth of it through the ocular optical system of the image display apparatus according to the present invention. If $\theta_i$ is not larger than the lower limit of the condition (11), i.e. -25°, or not smaller than the upper limit of the condition (11), i.e. 25°, the image for observation has an undesirably low contrast in a case where the image display device has a small viewing angle as viewing angle characteristic. Particularly, in the case of an LCD (Liquid Crystal Display), reversal of the image is likely to occur because of the small viewing angle, making it difficult to observe the image clearly.

Further, it is desirable to satisfy the following condition:

$$1.45<N_d<2.0 \quad (12)$$

where $N_d$ is the refractive index for the spectral d-line of the medium having a refractive index larger than 1.

Examples 1 to 10 (described later) correspond to this arrangement.

The above expression (12) is a condition concerning the refractive index of the medium that fills the space formed by the at least three surfaces. It is desirable that the ocular optical system of the image display apparatus according to the present invention should be formed by using a transparent medium of high transparency which is known as "optical glass" or "optical plastic". In this case, the refractive index for the spectral d-line of the medium must satisfy the condition (12). If the refractive index $N_d$ is not larger than the lower limit of the condition (12) or not smaller than the upper limit of the condition (12), transparency becomes undesirably low, and machinability degrades.

Further, it is preferable to satisfy the following condition:

$$1.5<N_d<2.0 \quad (13)$$

where $N_d$ is the refractive index for the spectral d-line of the medium having a refractive index larger than 1.

Examples 1 to 5 and 7 to 10 (described later) correspond to this arrangement.

It is favorable for the ocular optical system of the image display apparatus according to the present invention to have as large a refractive index as possible in order to satisfy the condition for internal reflection at the first surface. Therefore, it is desirable to use a medium that satisfies the condition (13). If the refractive index $N_d$ is not larger than the lower limit of the condition (13), i.e. 1.5, extra-axial light rays cannot satisfy the condition for total reflection at the first surface, particularly in the case of a wide field angle. Therefore, there are cases where it is difficult to observe the edge of the image.

Further, it is desirable that at least one of the surfaces constituting the ocular optical system should be an aspherical surface.

Examples 1 to 10 (described later) correspond to this arrangement.

It is effective for aberration correction that any one of the first, second and third surfaces of the ocular optical system is an aspherical surface. This is an important condition for correcting comatic aberrations, particularly higher-order comatic aberrations and coma flare, produced by the second surface 6 (see FIG. 1), which is decentered in a direction Y or tilted with respect to the visual axis 2 in a coordinate system (described later) which is defined as follows: As shown in FIG. 1, with the observer's iris position 1 defined as the origin, the direction of an observer's visual axis 2 is taken as the Z-axis, where the direction toward an ocular optical system 3 from the origin is defined as the positive direction, and the vertical direction (as viewed from the observer's eyeball) which perpendicularly intersects the observer's visual axis 2 is taken as the Y-axis, where the upward direction is defined as positive direction. Further, the horizontal direction (as viewed from the observer's eyeball) which perpendicularly intersects the observer's visual axis 2 is taken as the X-axis, where the leftward direction is defined as the positive direction.

In an image display apparatus which uses an ocular optical system of the type having a decentered or tilted reflecting surface in front of an observer's eyeball as in the present invention, light rays are obliquely incident on the reflecting surface, even on the axis. Therefore, complicated comatic aberration is produced at the center axis of the reflecting mirror. The complicated comatic aberration increases as the inclination angle of the reflecting surface becomes larger. However, if it is intended to realize a compact and wide-field image display apparatus, it is difficult to ensure an observation image having a wide field angle unless the amount of eccentricity (decentration) or the angle of inclination is increased to a certain extent because of the interference between the image display device and the optical path. Accordingly, as the field angle of an image display apparatus becomes wider and the size thereof becomes smaller, the inclination angle of the reflecting surface becomes larger. As a result, how to correct comatic aberration due to decentration becomes a serious problem.

To correct such complicated comatic aberration, any one of the first, second and third surfaces constituting the ocular optical system is formed into a decentered aspherical surface. By doing so, the power of the optical system can be made asymmetric with respect to the visual axis. Further, the effect of the aspherical surface can be utilized for off-axis aberration. Accordingly, it becomes possible to effectively correct comatic aberrations, including axial aberration.

Further, it is desirable that any one of the surfaces constituting the ocular optical system should be an anamorphic surface.

Examples 1 to 10 (described later) correspond to this arrangement.

It is desirable that any one of the first, second and third surfaces of the ocular optical system should be an anamorphic surface. That is, any one of the three surfaces should be a surface in which the curvature radius in the YZ-plane and the curvature radius in the XZ-plane, which perpendicularly intersects the YZ-plane, are different from each other.

The above is a condition for correcting aberration which occurs because the second surface is decentered or tilted with respect to the visual axis. In general, if a spherical surface is decentered, the curvature relative to light rays incident on the surface in the plane of incidence and that in a plane perpendicularly intersecting the incidence plane differ from each other. Therefore, in an ocular optical system where a reflecting surface is disposed in front of an observer's eyeball in such a manner as to be decentered or tilted with respect to the visual axis as in the present invention, an image on the visual axis lying in the center of the observation image also has astigmatic aberration for the reason stated above. In order to correct the axial astigmatism, it is important that any one of the first, second and third surfaces of the ocular optical system should be formed so that the curvature radius in the plane of incidence and that in a plane perpendicularly intersecting the incidence plane are different from each other.

Further, at least one of the surfaces constituting the ocular optical system may be a free curved surface.

If at least one of at least three surfaces constituting the ocular optical system is a free curved surface, it is possible to satisfy the condition for obtaining the above-described effect produced by an aspherical surface or an anamorphic surface, and hence possible to effectively correct aberrations produced in the ocular optical system.

Here, the free curved surface is a curved surface expressed by $$z = \sum_{n=0}^{k} \sum_{m=0}^{k'} C_{nm} x^m y^{n-m} \quad (14)$$

where x, y and z denote orthogonal coordinates, $C_{nm}$ is an arbitrary coefficient, and k and k' are also arbitrary values, respectively.

Further, it is desirable that the display surface of the image display device should be tilted with respect to the axial principal ray.

Examples 1 to 10 (described later) correspond to this arrangement.

It is important that the display surface of the image display device should be tilted with respect to the visual axis. In a case where a refracting or reflecting surface which constitutes an optical element is decentered or tilted, the refraction or reflection angle of light rays from the pupil at the refracting or reflecting surface vary according to the image height, and the image surface may be tilted with respect to the visual axis. In such a case, the tilt of the image surface can be corrected by tilting the display surface of the image display device with respect to the visual axis.

Further, it is desirable that the image display device should be disposed in such a manner that a side thereof which is reverse to its display surface faces the observer.

Examples 1 to 10 (described later) correspond to this arrangement.

An effective way of making the whole system compact is to dispose the image display device in such a manner that a side thereof which is reverse to its display surface faces the observer. In the case of an image display device which has a back light and other attachments provided behind it, these attachments are disposed along the observer's face; therefore, no part of the image display device projects forwardly beyond the ocular optical system. In other words, the whole image display apparatus can be arranged such that the amount to which the optical system projects from the observer's face is extremely small.

It should be noted that it becomes possible for the observer to see a stable observation image by providing a device for positioning both the image display device and the ocular optical system with respect to the observer's head.

By allowing both the image display device and the ocular optical system to be fitted to the observer's head with a supporting device, it becomes possible for the observer to see the observation image in a desired posture and from a desired direction.

Further, it becomes possible for the observer to enjoy viewing a stereoscopic image with both eyes by providing a device for supporting at least two image display apparatuses according to the present invention at a predetermined spacing.

Further, if the ocular optical system of the image display apparatus according to the present invention is arranged to form an image of an object at infinity with the image display device surface in the ocular optical system defined as an image surface, the ocular optical system can be used as an imaging optical system, e.g. a finder optical system for a camera such as that shown in FIG. 19, as described later.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 11a–11h is a part of an aberration diagram illustrating lateral aberrations in Example 1 of the present invention.

FIGS. 12a–12h is another part of the aberration diagram illustrating lateral aberrations in Example 1 of the present invention.

FIGS. 13a–13f is the other part of the aberration diagram illustrating lateral aberrations in Example 1 of the present invention.

FIG. 20 shows the optical system of a conventional image display apparatus.

FIGS. 21(a) and 21(b) show the optical system of another conventional image display apparatus.

FIG. 22 shows the optical system of still another conventional image display apparatus.

FIG. 23 shows the optical system of a further conventional image display apparatus.

DESCRIPTION OF THE PREFERRED EMBODIMENTS

Examples 1 to 10 of image display apparatuses according to the present invention will be described below with reference to the accompanying drawings.

Figure 1:
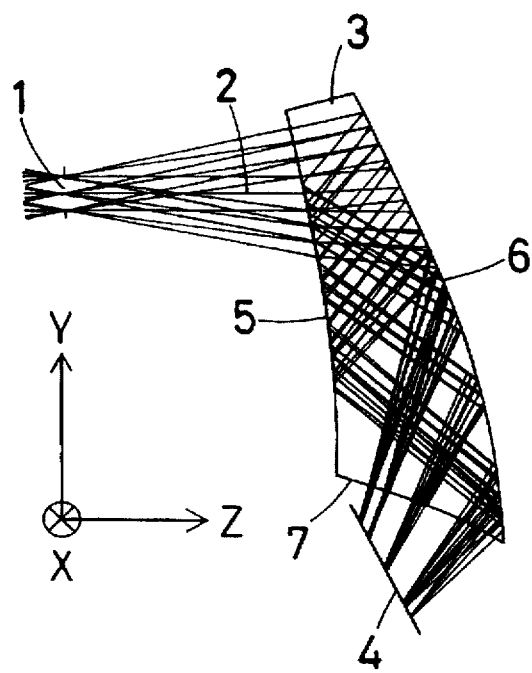
FIG. 1 illustrates an optical ray trace of Example 1 of an ocular optical system in an image display apparatus according to the present invention.

Constituent parameters of each example will be shown later. In the following description, the surface Nos. are shown as ordinal numbers in backward tracing from an observer's pupil position 1 toward an image display device 4. A coordinate system is defined as follows: As shown in FIG. 1, with the observer's iris position 1 defined as the origin, the direction of an observer's visual axis 2 is taken as the Z-axis, where the direction toward an ocular optical system 3 from the origin is defined as the positive direction, and the vertical direction (as viewed from the observer's eyeball) which perpendicularly intersects the observer's visual axis 2 is taken as the Y-axis, where the upward direction is defined as the positive direction. Further, the horizontal direction (as viewed from the observer's eyeball) which perpendicularly intersects the observer's visual axis 2 is taken as the X-axis, where the leftward direction is defined as the positive direction. That is, the plane of FIG. 1 (described later) is defined as the YZ-plane, and a plane which is perpendicular to the plane of the figure is defined as the XZ-plane. The optical axis is bent in the YZ-plane.

In the constituent parameters (shown later), regarding each surface for which eccentricities Y and Z and inclination angle θ are shown, the eccentricity Y is a distance by which the vertex of the surface decenters in the Y-axis direction from the surface No. 1 (pupil position 1), which is a reference surface, and the eccentricity Z is a distance by which the vertex of the surface decenters in the Z-axis direction from the surface No. 1. The inclination angle θ is the angle of inclination of the central axis of the surface from the Z-axis. In this case, positive θ means counterclockwise rotation. It should be noted that the surface separation is meaningless.

The non-rotationally symmetric aspherical configuration of each surface may be expressed in the coordinate system defining the surface as follows:

$$Z = [(X^2/R_x) + (Y^2/R_y)]/[1 + \{1 - (1 + K_x)(X^2/R_x^2) -$$
$$(1 + K_y)(Y^2/R_y^2)\}^{1/2}] + AR\,[(1 - AP)X^2 + (1 + AP)Y^2]^2 +$$
$$BR[(1 - BP)X^2 + (1 + BP)Y^2]^3$$

where $R_y$ is the paraxial curvature radius of each surface in the YZ-plane (the plane of the figure); $R_x$ is the paraxial curvature radius in the XZ-plane; $K_x$ is the conical coefficient in the XZ-plane; $K_y$ is the conical coefficient in the YZ-plane; AR and BR are 4th- and 6th-order aspherical coefficients, respectively, which are rotationally symmetric with respect to the Z-axis; and AP and BP are 4th- and 6th-order aspherical coefficients, respectively, which are rotationally asymmetric with respect to the Z-axis.

It should be noted that the refractive index of the medium between a pair of surfaces is expressed by the refractive index for the spectral d-line. Lengths are given in millimeters.

FIGS. 1 to 10 are sectional views of image display apparatuses designed for a single eye according to Examples 1 to 10. In the sectional views of FIGS. 1 to 5, reference numeral 1 denotes an observer's pupil position, 2 an observer's visual axis, 3 an ocular optical system, 4 an image display device, 5 a first surface of the ocular optical system 3, 6 a second surface of the ocular optical system 3, and 7 a third surface of the ocular optical system 3.

In the sectional views of FIGS. 6 to 10, reference numeral 1 denotes an observer's pupil position, 2 an observer's visual axis, 3 an ocular optical system, 4 an image display device, 11 a first surface of the ocular optical system 3, 12 a second surface of the ocular optical system 3, 13 a third surface of the ocular optical system 3, and 14 a fourth surface of the ocular optical system 3.

In these examples, the actual path of light rays is as follows: In Examples 1 to 5, a bundle of light rays emitted from the image display device 4 enters the ocular optical system 3 while being refracted by the third surface 7 of the ocular optical system 3. Then, the ray bundle is reflected by the second surface 6, internally reflected by the first surface 5 and reflected by the second surface 6 again. Then, the ray bundle is incident on the first surface 5 and exits from the ocular optical system 3 while being refracted by the first surface 5 so as to be projected into the observer's eyeball with the observer's iris position or eyeball rolling center as the exit pupil 1.

In Examples 6 to 10, a bundle of light rays emitted from the image display device 4 enters the ocular optical system 3 while being refracted by the fourth surface 14 of the ocular optical system 3. Then, the ray bundle is reflected by the third surface 13, internally reflected by the first surface 11 and reflected by the second surface 12. Then, the ray bundle is incident on the first surface 11 and exits from the ocular optical system 3 while being refracted by the first surface 11 so as to be projected into the observer's eyeball with the observer's iris position or eyeball rolling center as the exit pupil 1.

The following examples are all image display apparatuses for the right eye. An image display apparatus for the left eye can be realized by disposing the constituent optical elements of each example in symmetrical relation to the apparatus for the right eye with respect to the YZ-plane.

In an actual apparatus, needless to say, the direction in which the optical axis is bent by the ocular optical system may be any of the upward and sideward directions of the observer.

The following is an explanation of the field angle, pupil diameter, surface configuration of each surface, incident angle at each surface and refractive index of a transparent medium in each example.

Figure 2:
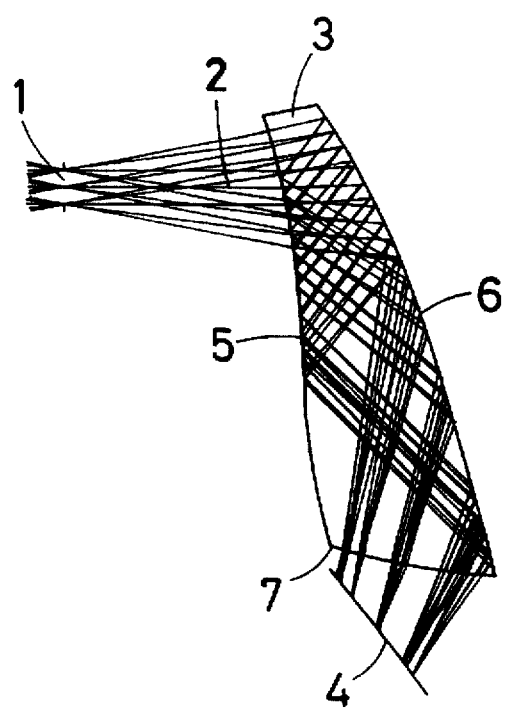
FIG. 2 illustrates an optical ray trace of Example 2 of an ocular optical system in an image display apparatus according to the present invention.
Figure 3:
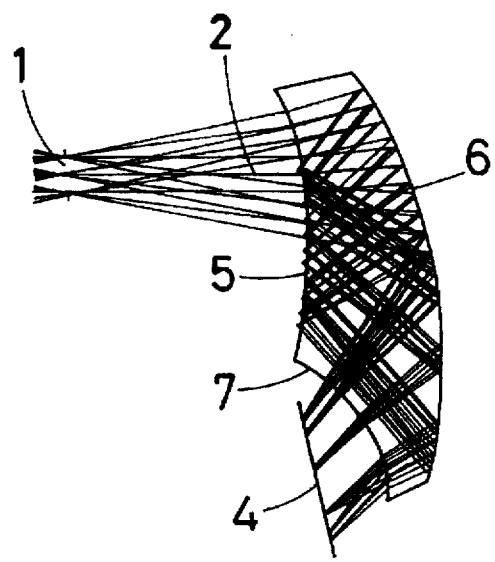
FIG. 3 illustrates an optical ray trace of Example 3 of an ocular optical system in an image display apparatus according to the present invention.
Figure 4:
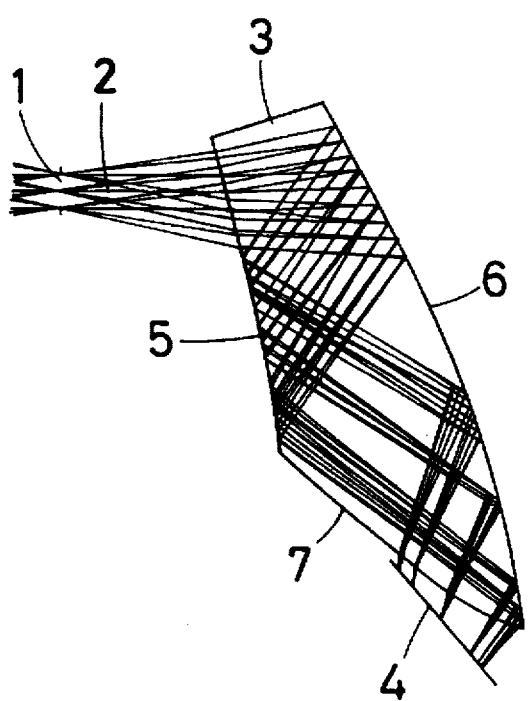
FIG. 4 illustrates an optical ray trace of Example 4 of an ocular optical system in an image display apparatus according to the present invention.
Figure 5:
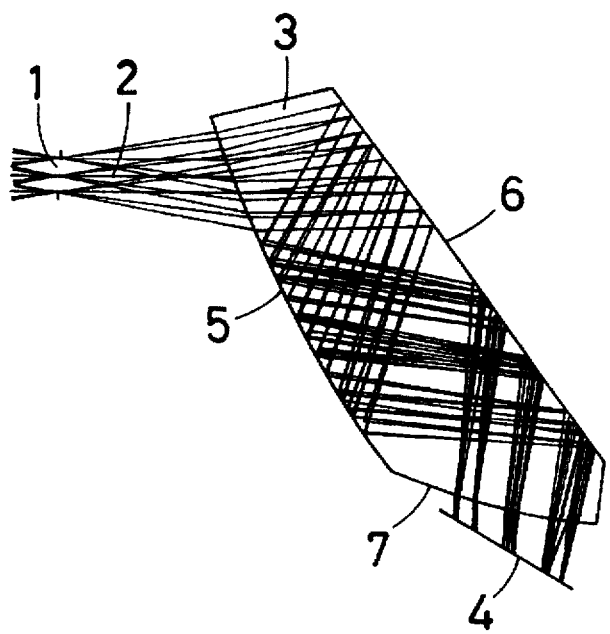
FIG. 5 illustrates an optical ray trace of Example 5 of an ocular optical system in an image display apparatus according to the present invention.
Figure 6:
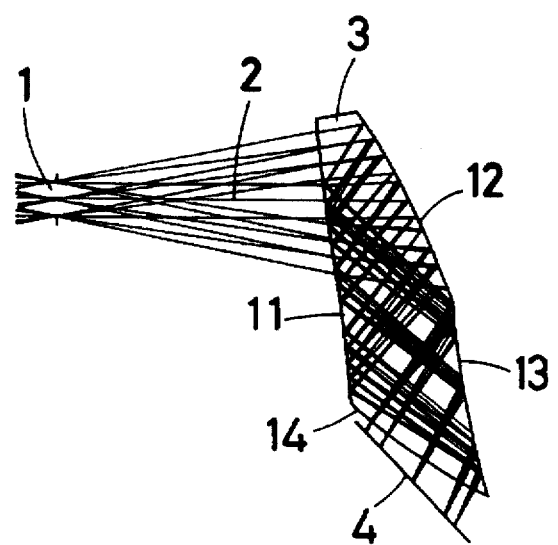
FIG. 6 illustrates an optical ray trace of Example 6 of an ocular optical system in an image display apparatus according to the present invention.
Figure 7:
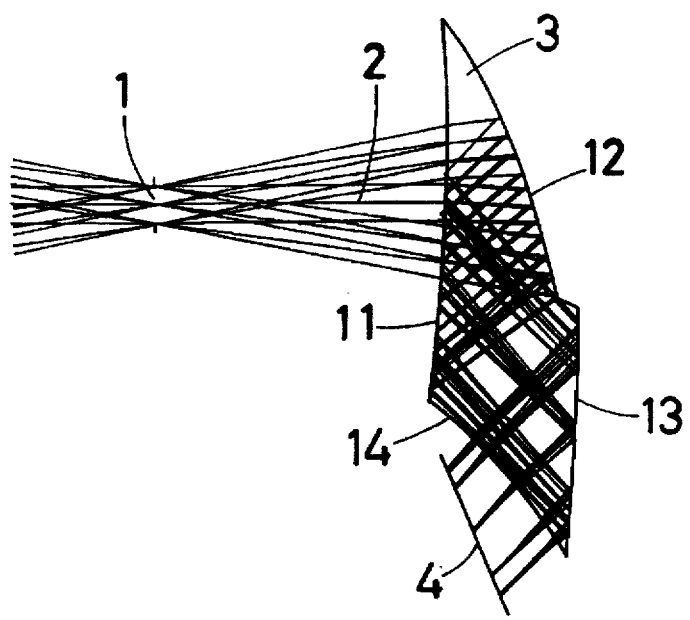
FIG. 7 illustrates an optical ray trace of Example 7 of an ocular optical system in an image display apparatus according to the present invention.
Figure 8:
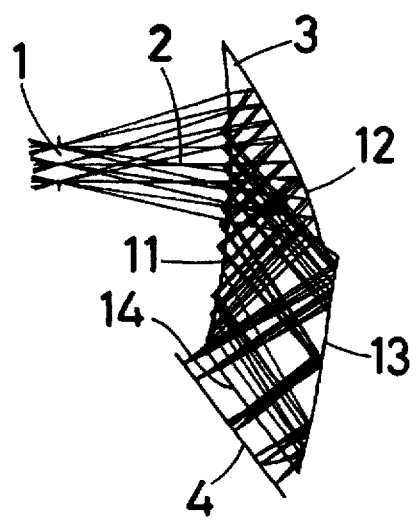
FIG. 8 illustrates an optical ray trace of Example 8 of an ocular optical system in an image display apparatus according to the present invention.
Figure 9:
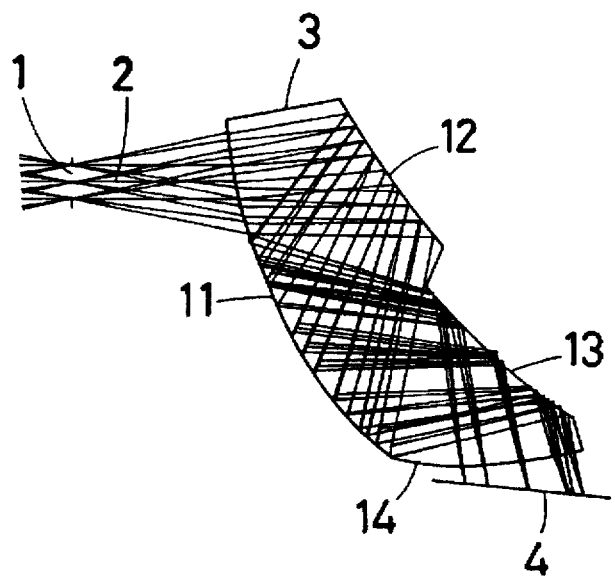
FIG. 9 illustrates an optical ray trace of Example 9 of an ocular optical system in an image display apparatus according to the present invention.
Figure 10:
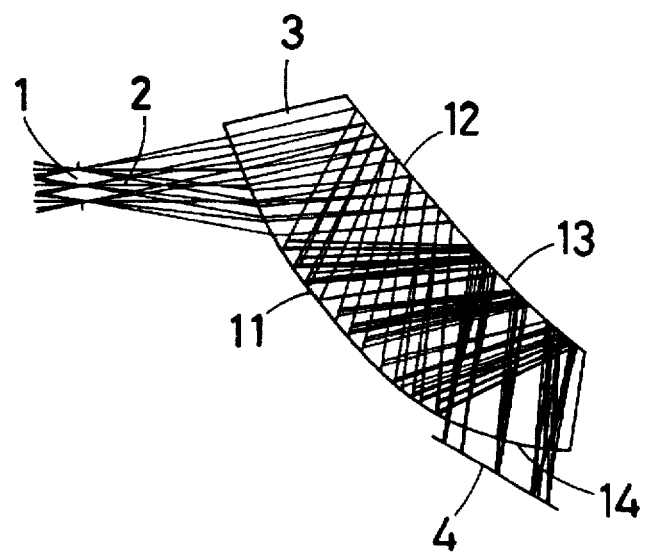
FIG. 10 illustrates an optical ray trace of Example 10 of an ocular optical system in an image display apparatus according to the present invention.
Figure 14A:
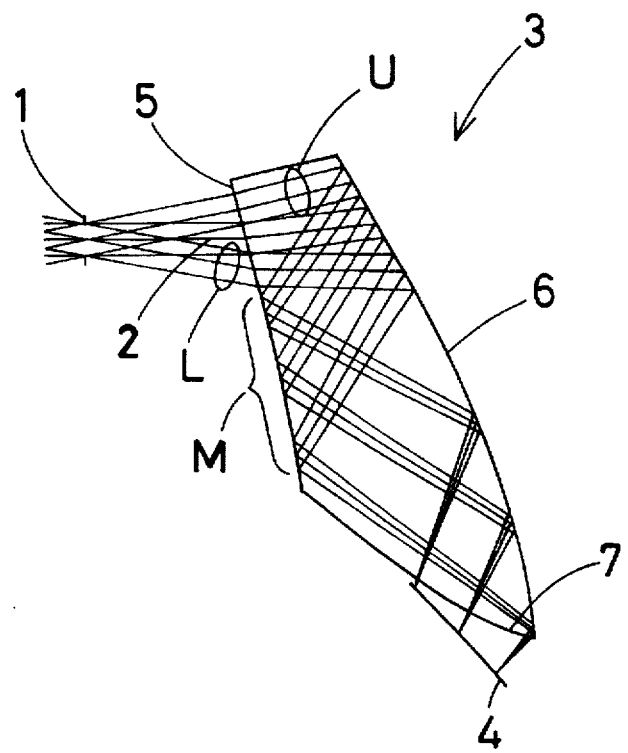
FIGS. 14(a) and 14(b) are views used to explain internal reflection at a first surface of an ocular optical system according to the present invention.
Figure 14B:
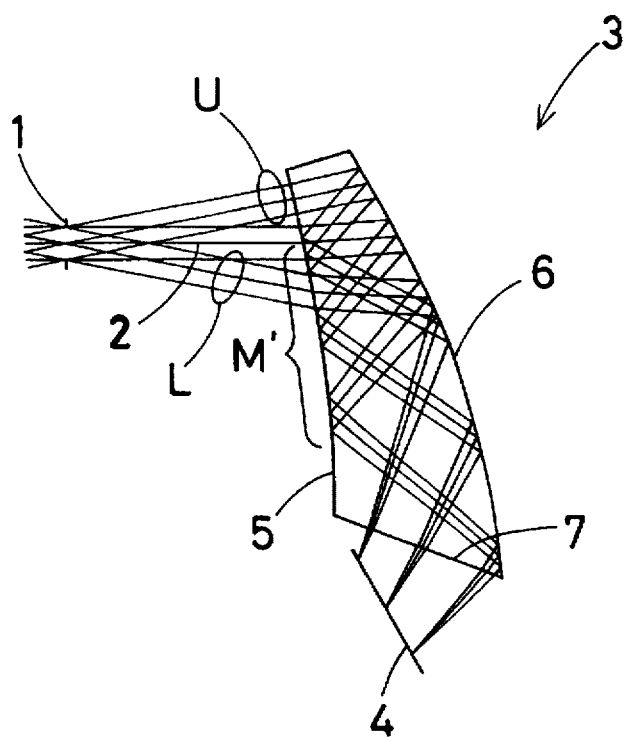
Figure 15A:
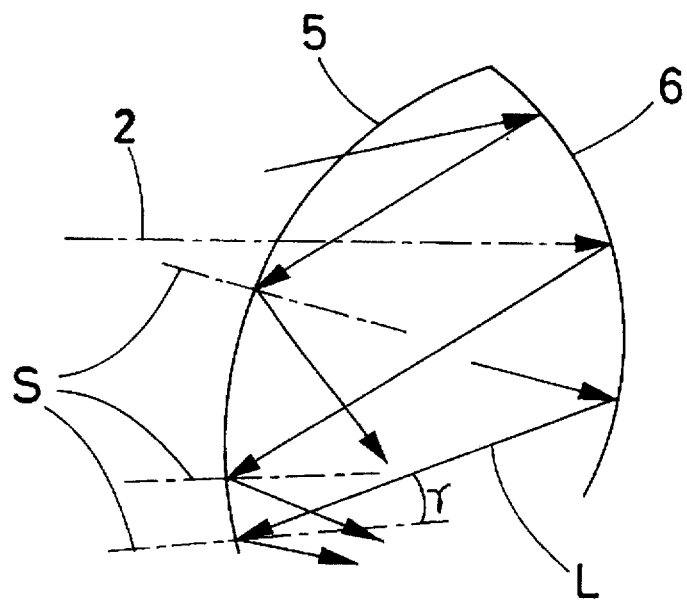
FIGS. 15(a) and 15(b) are views used to explain the relationship between total reflection and the configuration of a first surface of an ocular optical system according to the present invention.
Figure 15B:
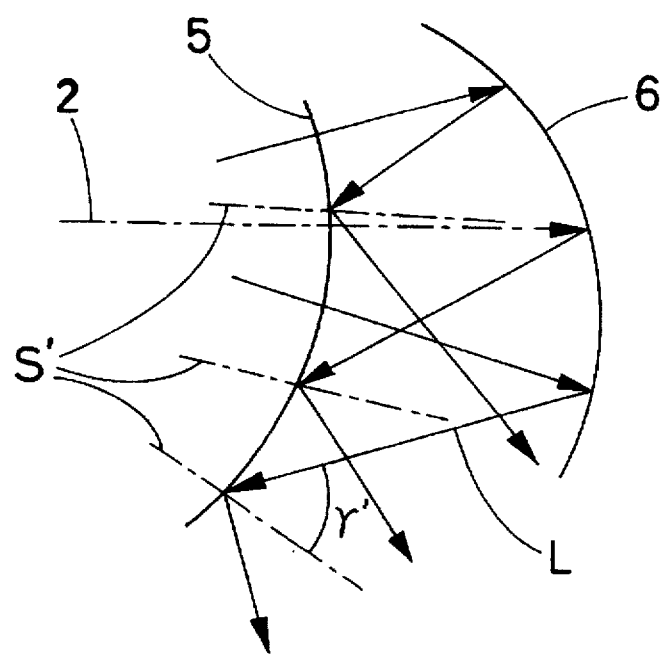
Figure 16:
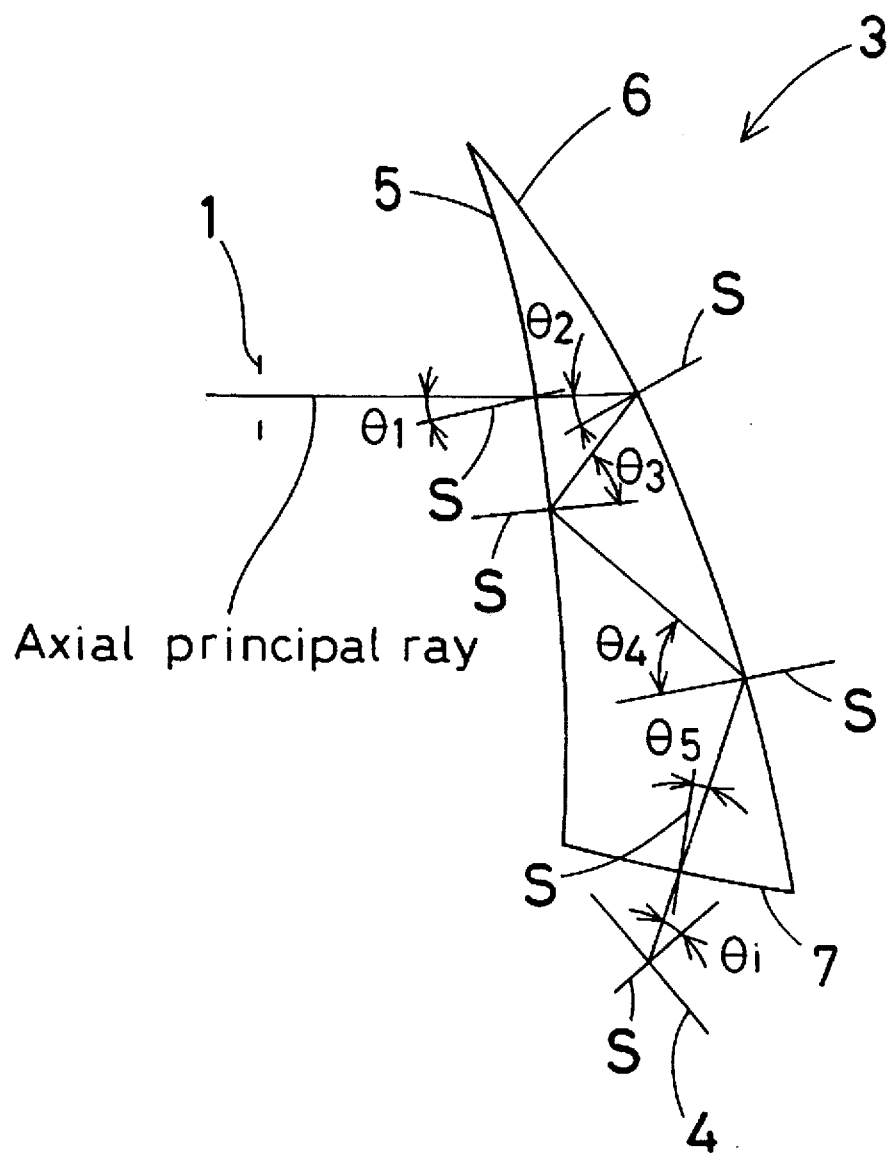
FIG. 16 shows the way of giving a definition of an incident angle of an axial principal ray striking each surface.

Example 1 is one example of an ocular optical system comprising three surfaces as shown in the sectional view of FIG. 1. In this example, the horizontal field angle is 30°, while the vertical field angle is 22.8°, and the pupil diameter is 4 millimeters. The first surface (surface Nos. 2 and 4) 5, the second surface (surface Nos. 3 and 5) 6, and the third surface (surface No. 6) 7 are all anamorphic surfaces. Internal reflection at the first surface 5 is total reflection. Values for the conditions (1) to (13) are as follows:

$\theta_1 = 11.14°$ $\theta_2 = 22.64°$ $\theta_3 = 41.71°$ $\theta_4 = 48.13°$ $\theta_5 = 6.53°$ $\theta_f = 30.00°$ $N_d = 1.6481$ Example 2 is one example of an ocular optical system comprising three surfaces as shown in the sectional view of FIG. 2. In this example, the horizontal field angle is 30°, while the vertical field angle is 22.8°, and the pupil diameter is 4 millimeters. The first surface (surface Nos. 2 and 4) 5 and the second surface (surface Nos. 3 and 5) 6 are anamorphic surfaces, and the third surface (surface No. 6) 7 is a spherical surface. Internal reflection at the first surface 5 is total reflection. Values for the conditions (1) to (13) are as follows:

$\theta_1 = 10.68°$ $\theta_2 = 24.93°$ $\theta_3 = 46.20°$ $\theta_4 = 55.63°$ $\theta_5 = 7.30°$ $\theta_f = 30.00°$ $N_d = 1.5163$ Example 3 is one example of an ocular optical system comprising three surfaces as shown in the sectional view of FIG. 3. In this example, the horizontal field angle is 30°, while the vertical field angle is 22.8°, and the pupil diameter is 4 millimeters. The first surface (surface Nos. 2 and 4) 5 and the second surface (surface Nos. 3 and 5) 6 are anamorphic surfaces, and the third surface (surface No. 6) 7 is a spherical surface. Internal reflection at the first surface 5 is total reflection. Values for the conditions (1) to (13) are as follows:

$\theta_1 = 11.78°$ $\theta_2 = 18.45°$ $\theta_3 = 40.59°$ $\theta_4 = 38.85°$ $\theta_5 = -7.49°$ $\theta_f=30.09°$ $N_d=1.7433$ Example 4 is one example of an ocular optical system comprising three surfaces as shown in the sectional view of FIG. 4. In this example, the horizontal field angle is 28°, while the vertical field angle is 21.2°, and the pupil diameter is 4 millimeters. The first surface (surface Nos. 2 and 4) 5 and the second surface (surface Nos. 3 and 5) 6 are anamorphic surfaces, and the third surface (surface No. 6) 7 is a spherical surface. Internal reflection at the first surface 5 is realized by mirror coating. Values for the conditions (1) to (13) are as follows:

$\theta_1=14.75°$ $\theta_2=25.72°$ $\theta_3=44.37°$ $\theta_4=48.25°$ $\theta_5=-3.61°$ $\theta_f=23.58°$ $N_d=1.5163$ Example 5 is one example of an ocular optical system comprising three surfaces as shown in the sectional view of FIG. 5. In this example, the horizontal field angle is 28°, while the vertical field angle is 21.2°, and the pupil diameter is 4 millimeters. The first surface (surface Nos. 2 and 4) 5 is an anamorphic surface. The second surface (surface Nos. 3 and 5) 6 is a flat surface, and the third surface (surface No. 6) 7 is a spherical surface. Internal reflection at the first surface 5 is realized by mirror coating. Values for the conditions (1) to (13) are as follows:

$\theta_1=21.92°$ $\theta_2=29.66°$ $\theta_3=37.39°$ $\theta_4=45.13°$ $\theta_5=-2.36°$ $\theta_f=23.58°$ $N_d=1.5163$ Example 6 is one example of an ocular optical system comprising four surfaces as shown in the sectional view of FIG. 6. In this example, the horizontal field angle is 30°, while the vertical field angle is 22.8°, and the pupil diameter is 4 millimeters. The first surface (surface Nos. 2 and 4) 11 is a flat surface, and the second surface (surface No. 3) 12, the third surface (surface No. 5) 13 and the fourth surface (surface No. 6) 14 are anamorphic surfaces. Internal reflection at the first surface 11 is total reflection. Values for the conditions (1) to (13) are as follows:

$\theta_1=7.7°$ $\theta_2=25.23°$ $\theta_3=45.29°$ $\theta_4=48.31°$ $\theta_5=0.76°$ $\theta_f=14.41°$ $N_d=1.4870$ Example 7 is one example of an ocular optical system comprising four surfaces as shown in the sectional view of FIG. 7. In this example, the horizontal field angle is 30°, while the vertical field angle is 22.8°, and the pupil diameter is 4 millimeters. The first surface (surface Nos. 2 and 4) 11 is a spherical surface. The second surface (surface No. 3) 12 and the third surface (surface No. 5) 13 are anamorphic surfaces, and the fourth surface (surface No. 6) 14 is a spherical surface. Internal reflection at the first surface 11 is total reflection. Values for the conditions (1) to (13) are as follows:

$\theta_1=1.81°$ $\theta_2=20.61°$ $\theta_3=43.42°$ $\theta_4=43.88°$ $\theta_5=0.28°$ $\theta_f=17.20°$ $N_d=1.5163$ Example 8 is one example of an ocular optical system comprising four surfaces as shown in the sectional view of FIG. 8. In this example, the horizontal field angle is 40°, while the vertical field angle is 30.6°, and the pupil diameter is 4 millimeters. The first surface (surface Nos. 2 and 4) 11, the second surface (surface No. 3) 12, the third surface (surface No. 5) 13 and the fourth surface (surface No. 6) 14 are all anamorphic surfaces. Internal reflection at the first surface 11 is total reflection. Values for the conditions (1) to (13) are as follows:

$\theta_1=1.28°$ $\theta_2=23.53°$ $\theta_3=49.91°$ $\theta_4=41.12°$ $\theta_5=9.02°$ $\theta_f=10.85°$ $N_d=1.5338$ Example 9 is one example of an ocular optical system comprising four surfaces as shown in the sectional view of FIG. 9. In this example, the horizontal field angle is 30°, while the vertical field angle is 22.6°, and the pupil diameter is 4 millimeters. The first surface (surface Nos. 2 and 4) 11 is a spherical surface. The second surface (surface No. 3) 12 and the third surface (surface No. 5) 13 are anamorphic surfaces, and the fourth surface (surface No. 6) 14 is a spherical surface. Internal reflection at the first surface 11 is realized by mirror coating. Values for the conditions (1) to (13) are as follows:

$\theta_1=10.90°$ $\theta_2=30.73°$ $\theta_3=34.05°$ $\theta_4=53.95°$ $\theta_5 = -6.61°$ $\theta_f = 23.58°$ $N_d = 1.5163$ Example 10 is one example of an ocular optical system comprising four surfaces as shown in the sectional view of FIG. 10. In this example, the horizontal field angle is 28°, while the vertical field angle is 21.2°, and the pupil diameter is 4 millimeters. The first surface (surface Nos. 2 and 4) 11 is a spherical surface. The second surface (surface No. 3) 12 and the third surface (surface No. 5) 13 are anamorphic surfaces, and the fourth surface (surface No. 6) 14 is a spherical surface. Internal reflection at the first surface 11 is realized by mirror coating. Values for the conditions (1) to (13) are as follows:

$\theta_1 = 22.80°$ $\theta_2 = 32.25°$ $\theta_3 = 30.96°$ $\theta_4 = 35.41°$ $\theta_5 = -4.20°$ $\theta_f = 23.58°$ $N_d = 1.5163$ Values of constituent parameters in the above-described Examples 1 to 10 in backward ray tracing will be shown below.

| Surface No. | Radius of curvature | | Surface separation | Refractive index (Eccentricity) | Abbe's No. (Inclination angle) |
|---|---|---|---|---|---|
| | | | Example 1 | | |
| 1 | ∞ (pupil) | | | | |
| 2 | $R_y$ | −210.566 | | 1.6481 | 55.28 |
| | $R_x$ | −616.660 | Y −26.631 | θ | 34.36° |
| | $K_y$ | 0 | Z 3.827 | | |
| | $K_x$ | 0 | | | |
| | AR | 0 | | | |
| | BR | 0 | | | |
| | AP | 0 | | | |
| | BP | 0 | | | |
| 3 | $R_y$ | −130.170 | | 1.6481 | 55.28 |
| | $R_x$ | −131.141 | Y 41.547 | θ | 10.87° |
| | $K_y$ | 0 | Z 50.217 | | |
| | $K_x$ | 0 | | | |
| | AR | $-2.8856 \times 10^{-10}$ | | | |
| | BR | $-2.3366 \times 10^{-15}$ | | | |
| | AP | −4.1410 | | | |
| | BP | 5.4988 | | | |
| 4 | $R_y$ | −210.566 | | 1.6481 | 55.28 |
| | $R_x$ | −616.660 | Y −26.631 | θ | 34.36° |
| | $K_y$ | 0 | Z 3.827 | | |
| | $K_x$ | 0 | | | |
| | AR | 0 | | | |
| | BR | 0 | | | |
| | AP | 0 | | | |
| | BP | 0 | | | |
| 5 | $R_y$ | −130.170 | | 1.6481 | 55.28 |
| | $R_x$ | −131.141 | Y 41.547 | θ | 10.87° |
| | $K_y$ | 0 | Z 50.217 | | |
| | $K_x$ | 0 | | | |
| | AR | $-2.8856 \times 10^{-10}$ | | | |
| | BR | $-2.3366 \times 10^{-15}$ | | | |
| | AP | −4.1410 | | | |
| | BP | 5.4988 | | | |

-continued

| Surface No. | Radius of curvature | | Surface separation | Refractive index (Eccentricity) | Abbe's No. (Inclination angle) |
|---|---|---|---|---|---|
| 6 | $R_y$ | −139.371 | Y −39.978 | θ | 49.40° |
| | $R_x$ | 339.330 | Z 67.618 | | |
| | $K_y$ | 0 | | | |
| | $K_x$ | 0 | | | |
| | AR | 0 | | | |
| | BR | 0 | | | |
| | AP | 0 | | | |
| | BP | 0 | | | |
| 7 | (display device) | | Y −46.520 | θ | 28.24° |
| | | | Z 41.317 | | |
| | | | Example 2 | | |
| 1 | ∞ (pupil) | | | | |
| 2 | $R_y$ | −161.656 | | 1.5163 | 64.15 |
| | $R_x$ | −1301.410 | Y 3.977 | θ | 26.73° |
| | $K_y$ | 0 | Z 12.107 | | |
| | $K_x$ | 0 | | | |
| | AR | $1.9502 \times 10^{-7}$ | | | |
| | BR | $-1.0740 \times 10^{-11}$ | | | |
| | AP | 1.1334 | | | |
| | BP | 2.0740 | | | |
| 3 | $R_y$ | −136.884 | | 1.5163 | 64.15 |
| | $R_x$ | −147.084 | Y 4.315 | θ | 35.86° |
| | $K_y$ | −0.4474 | Z 30.348 | | |
| | $K_x$ | −1.1088 | | | |
| | AR | $5.6195 \times 10^{-8}$ | | | |
| | BR | $-8.8973 \times 10^{-15}$ | | | |
| | AP | $2.6626 \times 10^{-1}$ | | | |
| | BP | 7.2753 | | | |
| 4 | $R_y$ | −161.656 | | 1.5163 | 64.15 |
| | $R_x$ | −1301.410 | Y 3.977 | θ | 26.73° |
| | $K_y$ | 0 | Z 12.107 | | |
| | $K_x$ | 0 | | | |
| | AR | $1.9502 \times 10^{-7}$ | | | |
| | BR | $1.0740 \times 10^{-11}$ | | | |
| | AP | 1.1334 | | | |
| | BP | 2.0740 | | | |
| 5 | $R_y$ | −136.884 | | 1.5163 | 64.15 |
| | $R_x$ | −147.084 | Y 4.315 | θ | 35.86° |
| | $K_y$ | −0.4474 | Z 30.348 | | |
| | $K_x$ | −1.1088 | | | |
| | AR | $5.6195 \times 10^{-8}$ | | | |
| | BR | $-8.8973 \times 10^{-15}$ | | | |
| | AP | $2.6626 \times 10^{-1}$ | | | |
| | BP | 7.2753 | | | |
| 6 | 192.794 | | Y −47.076 | θ | 79.13° |
| | | | Z 41.366 | | |
| 7 | (display device) | | Y −56.120 | θ | 38.58° |
| | | | Z 39.788 | | |
| | | | Example 3 | | |
| 1 | ∞ (pupil) | | | | |
| 2 | $R_y$ | −51.348 | | 1.7433 | 44.75 |
| | $R_x$ | −45.397 | Y −8.790 | θ | 29.67° |
| | $K_y$ | −0.0909 | Z 1.764 | | |
| | $K_x$ | 1.6087 | | | |
| | AR | $-2.7583 \times 10^{-8}$ | | | |
| | BR | $-2.8974 \times 10^{-10}$ | | | |
| | AP | −2.4093 | | | |
| | BP | 1.9705 | | | |
| 3 | $R_y$ | −57.489 | | 1.7433 | 44.75 |
| | $R_x$ | −53.053 | Y 15.378 | θ | 32.14° |
| | $K_y$ | −0.1177 | Z 40.450 | | |
| | $K_x$ | 0.1510 | | | |
| | AR | $-5.1413 \times 10^{-9}$ | | | |
| | BR | $4.8987 \times 10^{-11}$ | | | |
| | AP | −7.1903 | | | |
| | BP | $-4.2086 \times 10^{-1}$ | | | |
| 4 | $R_y$ | −51.348 | | 1.7433 | 44.75 |
| | $R_x$ | −45.397 | Y −8.790 | θ | 29.67° |
| | $K_y$ | −0.0909 | Z 1.764 | | |
| | $K_x$ | 1.6087 | | | |
| | AR | $-2.7583 \times 10^{-8}$ | | | |
| | BR | $-2.8974 \times 10^{-10}$ | | | |
| | AP | −2.4093 | | | |

-continued

| Surface No. | | Radius of curvature | Surface separation | Refractive index (Eccentricity) | Abbe's No. (Inclination angle) |
|---|---|---|---|---|---|
| | BP | 1.9705 | | | |
| 5 | $R_y$ | −57.489 | | 1.7433 | 44.75 |
| | $R_x$ | −53.053 | Y 15.378 | θ | 32.14° |
| | $K_y$ | −0.1177 | Z 40.450 | | |
| | $K_x$ | 0.1510 | | | |
| | AR | $-5.1413 \times 10^{-9}$ | | | |
| | BR | $4.8987 \times 10^{-11}$ | | | |
| | AP | −7.1903 | | | |
| | BP | $-4.2086 \times 10^{-1}$ | | | |
| 6 | | −17.021 | Y −21.771 | θ | 72.83° |
| | | | Z 27.458 | | |
| 7 | | (display device) | Y −35.479 | θ | 14.03° |
| | | | Z 30.627 | | |

Example 4

| 1 | | ∞ (pupil) | | | |
|---|---|---|---|---|---|
| 2 | $R_y$ | −408.985 | | 1.5163 | 64.15 |
| | $R_x$ | −283.326 | Y −14.922 | θ | 24.30° |
| | $K_y$ | 0 | Z 12.616 | | |
| | $K_x$ | 0 | | | |
| | AR | $-6.5368 \times 10^{-8}$ | | | |
| | BR | $2.6628 \times 10^{-11}$ | | | |
| | AP | $-4.2799 \times 10^{-2}$ | | | |
| | BP | 1.0453 | | | |
| 3 | $R_y$ | −137.122 | | 1.5163 | 64.15 |
| | $R_x$ | 109.735 | Y 5.062 | θ | 35.80° |
| | $K_y$ | −3.3707 | Z 32.532 | | |
| | $K_x$ | −2.6799 | | | |
| | AR | $9.0123 \times 10^{-8}$ | | | |
| | BR | $5.8457 \times 10^{-4}$ | | | |
| | AP | $-3.5746 \times 10^{-2}$ | | | |
| | BP | −9.1012 | | | |
| 4 | $R_y$ | −408.985 | | 1.5163 | 64.15 |
| | $R_x$ | −283.326 | Y 14.922 | θ | 24.30° |
| | $K_y$ | 0 | Z 12.616 | | |
| | $K_x$ | 0 | | | |
| | AR | $-6.5368 \times 10^{-8}$ | | | |
| | BR | $2.6628 \times 10{-11}$ | | | |
| | AP | $-4.2799 \times 10{-2}$ | | | |
| | BP | 1.0453 | | | |
| 5 | $R_y$ | −137.122 | | 1.5163 | 64.15 |
| | $R_x$ | −109.735 | Y 5.062 | θ | 35.80° |
| | $K_y$ | −3.3707 | Z 32.532 | | |
| | $K_x$ | −2.6799 | | | |
| | AR | $9.0123 \times 10^{-8}$ | | | |
| | BR | $5.8457 \times 10^{-14}$ | | | |
| | AP | $-3.5746 \times 10^{-2}$ | | | |
| | BP | −9.1012 | | | |
| 6 | | 39.708 | Y −49.190 | θ | 66.30° |
| | | | Z 52.374 | | |
| 7 | | (display device) | Y −50.195 | θ | 42.57° |
| | | | Z 47.677 | | |

Example 5

| 1 | | ∞ (pupil) | | | |
|---|---|---|---|---|---|
| 2 | $R_y$ | 155.857 | | 1.5163 | 64.15 |
| | $R_x$ | 108.364 | Y −20.000 | θ | 30.81° |
| | $K_y$ | 0 | Z 30.000 | | |
| | $K_x$ | 0 | | | |
| | AR | $-1.1508 \times 10^{-7}$ | | | |
| | BR | $1.1468 \times 10^{-10}$ | | | |
| | AP | −1.3330 | | | |
| | BP | −1.7019 | | | |
| 3 | | ∞ | | 1.5163 | 64.15 |
| | | | Y −1.565 | θ | 37.32° |
| | | | Z 42.461 | | |
| 4 | $R_y$ | 155.857 | | 1.5163 | 64.15 |
| | $R_x$ | 108.364 | Y −20.000 | θ | 30.81° |
| | $K_y$ | 0 | Z 30.000 | | |
| | $K_x$ | 0 | | | |
| | AR | $-1.1508 \times 10^{-7}$ | | | |
| | BR | $1.1468 \times 10^{-10}$ | | | |
| | AP | −1.3330 | | | |
| | BP | −1.7019 | | | |
| 5 | | ∞ | | 1.5163 | 64.15 |
| | | | Y −1.565 | θ | 37.32° |
| | | | Z 42.461 | | |
| 6 | | 70.244 | Y −33.253 | θ | 62.66° |
| | | | Z 36.315 | | |
| 7 | | (display device) | Y −44.749 | 0 | 60.09 |
| | | | Z 55.961 | | |

Example 6

| 1 | | ∞ (pupil) | | | |
|---|---|---|---|---|---|
| 2 | | ∞ | | 1.4870 | 70.40 |
| | | | Y 0.000 | θ | 7.70° |
| | | | Z 33.232 | | |
| 3 | $R_y$ | −92.681 | | 1.4870 | 70.40 |
| | $R_x$ | −91.368 | Y 10.225 | θ | 37.34° |
| | $K_y$ | 2.9442 | Z 34.669 | | |
| | $K_x$ | −6.4492 | | | |
| | AR | $6.7868 \times 10^{-9}$ | | | |
| | BR | $1.2064 \times 10^{-12}$ | | | |
| | AP | $1.1032 \times 10$ | | | |
| | BP | −3.6642 | | | |
| 4 | | ∞ | | 1.4870 | 70.40 |
| | | | Y 0.000 | θ | 7.70° |
| | | | Z 33.232 | | |
| 5 | $R_y$ | −227.431 | | 1.4870 | 70.40 |
| | $R_x$ | −73.582 | Y 30.000 | θ | 48.36° |
| | $K_y$ | 0 | Z 2.395 | | |
| | $K_x$ | 0 | | | |
| | AR | $4.6395 \times 10^{-7}$ | | | |
| | BR | $1.1004 \times 10^{-11}$ | | | |
| | AP | $5.1263 \times 10^{-1}$ | | | |
| | BP | −3.0762 | | | |
| 6 | $R_y$ | 66.981 | | | |
| | $R_x$ | 16.415 | Y −36.765 | θ | 57.28° |
| | $K_y$ | 0 | Z 69.400 | | |
| | $K_x$ | 0 | | | |
| | AR | $2.2637 \times 10^{-6}$ | | | |
| | BR | $-7.3017 \times 10^{-8}$ | | | |
| | AP | $-3.7748 \times 10^{-1}$ | | | |
| | BP | $-6.6901 \times 10^{-1}$ | | | |
| 7 | | (display device) | Y −33.673 | θ | 45.00° |
| | | | Z 44.201 | | |

Example 7

| 1 | | ∞ (pupil) | | | |
|---|---|---|---|---|---|
| | | −542.306 | | 1.5163 | 64.15 |
| | | | Y 70.778 | θ | 5.68° |
| | | | Z 30.533 | | |
| 3 | $R_y$ | −105.705 | | 1.5163 | 64.15 |
| | $R_x$ | −89.941 | Y 10.014 | θ | 39.19° |
| | $K_y$ | −0.1753 | Z 25.954 | | |
| | $K_x$ | −0.8315 | | | |
| | AR | $3.6313 \times 10^{-9}$ | | | |
| | BR | $6.1440 \times 10^{-18}$ | | | |
| | AP | $-8.7199 \times 10^{-2}$ | | | |
| | BP | $-5.0996 \times 10$ | | | |
| 4 | | −542.306 | | 1.5163 | 64.15 |
| | | | Y 70.778 | | 5.68° |
| | | | Z 30.533 | | |
| 5 | $R_x$ | −180.609 | | 1.5163 | 64.15 |
| | $R_y$ | −1143.935 | Y 40.198 | θ | 41.35° |
| | $K_y$ | 0.1463 | Z 16.177 | | |
| | $K_x$ | −1488.0941 | | | |
| | AR | $2.0564 \times 10^{-8}$ | | | |
| | BR | $5.2529 \times 10^{-14}$ | | | |
| | AP | $-3.7942 \times 10^{-2}$ | | | |
| | BP | 3.6207 | | | |
| 6 | | −74.701 | Y −39.077 | θ | 34.94° |
| | | | Z 47.282 | | |
| 7 | | (display device) | Y −36.693 | | 24.18° |
| | | | Z 36.463 | | |

Example 8

| 1 | | ∞ (pupil) | | | |
|---|---|---|---|---|---|
| 2 | $R_y$ | −245.203 | | 1.5338 | 65.89 |

-continued

| Surface No. | | Radius of curvature | Surface separation | Refractive index (Eccentricity) | Abbe's No. (Inclination angle) |
|---|---|---|---|---|---|
| | $R_x$ | −52.851 | Y | 0.000 | 20.00° |
| | $K_y$ | 0 | Z | −1.281 | |
| | AR | 0 | | | |
| | BR | 0 | | | |
| | AP | 0 | | | |
| | BP | 0 | | | |
| 3 | $R_y$ | −59.102 | | 1.5338 | 65.89 |
| | $R_x$ | −45.130 | Y | 15.989 θ | 17.99° |
| | $K_y$ | −0.9559 | Z | 40.072 | |
| | $K_x$ | −0.2970 | | | |
| | AR | $6.4446 \times 10^{-9}$ | | | |
| | BR | $9.3898 \times 10^{-14}$ | | | |
| | AP | 7.4590 | | | |
| | BP | $-1.3817 \times 10$ | | | |
| 4 | $R_y$ | −245.203 | | 1.5338 | 65.89 |
| | $R_x$ | −52.851 | Y | 0.000 θ | 20.00° |
| | $K_y$ | 0 | Z | −1.281 | |
| | $K_x$ | 0 | | | |
| | AR | 0 | | | |
| | BR | 0 | | | |
| | AP | 0 | | | |
| | BP | 0 | | | |
| 5 | $R_y$ | −92.593 | | 1.5338 | 65.89 |
| | $R_x$ | −71.241 | Y | 29.319 θ | 41.82° |
| | $K_y$ | 0 | Z | −4.482 | |
| | $K_x$ | 0 | | | |
| | AR | $7.6834 \times 10^{-7}$ | | | |
| | BR | $1.6178 \times 10^{-11}$ | | | |
| | AP | $4.2887 \times 10^{-1}$ | | | |
| | BP | −3.0887 | | | |
| 6 | $R_y$ | −72.841 | Y | −28.655 θ | 22.75° |
| | $R_x$ | 81.858 | Z | 36.867 | |
| | $K_y$ | 0 | | | |
| | $K_x$ | 0 | | | |
| | AR | $6.7391 \times 10^{-7}$ | | | |
| | BR | $-4.2424 \times 10^{-10}$ | | | |
| | AP | $-1.1564 \times 10$ | | | |
| | BP | −8.0054 | | | |
| 7 | (display device) | | Y | −28.600 θ | 35.00° |
| | | | Z | 19.053 | |

Example 9

| 1 | ∞ (pupil) | | | | |
| 2 | 64.328 | | | 1.5163 | 64.15 |
| | | | Y | −20.000 θ | 30.00° |
| | | | Z | 27.699 | |
| 3 | $R_y$ | 139.632 | | 1.5163 | 64.15 |
| | $R_x$ | 277.392 | Y | 0.129 | 39.41° |
| | $K_y$ | −10.6785 | Z | 35.000 | |
| | $K_x$ | 20.0000 | | | |
| | AR | $-7.5208 \times 10^{-9}$ | | | |
| | BR | $9.3767 \times 10^{-13}$ | | | |
| | AP | 3.6868 | | | |
| | BP | −6.5396 | | | |
| 4 | 64.328 | | | 1.5163 | 64.15 |
| | | | Y | −20.000 θ | 30.00° |
| | | | Z | 27.699 | |
| 5 | $R_y$ | 61.956 | | 1.5163 | 64.15 |
| | $R_x$ | 70.808 | Y | −2.352 θ | 36.43° |
| | $K_y$ | 0 | Z | 27.385 | |
| | K | 0 | | | |
| | AR | $3.5927 \times 10^{-7}$ | | | |
| | BR | $-4.9429 \times 10^{-10}$ | | | |
| | AP | −1.7527 | | | |
| | BP | $-9.8564 \times 10^{-2}$ | | | |
| 6 | 45.850 | | Y | −33.382 θ | 72.85° |
| | | | Z | 36.018 | |
| 7 | (display device) | | Y | −38.077 θ | 84.87° |
| | | | Z | 57.285 | |

Example 10

| 1 | ∞ (pupil) | | | | |
| 2 | 68.114 | | | 1.5163 | 64.15 |
| | | | Y | −7.666 θ | 30.00° |
| | | | Z | 24.886 | |

-continued

| Surface No. | | Radius of curvature | Surface separation | Refractive index (Eccentricity) | Abbe's No. (Inclination angle) |
|---|---|---|---|---|---|
| 3 | $R_y$ | 172.006 | | 1.5163 | 64.15 |
| | $R_x$ | 270.352 | Y | 3.180 θ | 39.16° |
| | $K_y$ | 20.0000 | Z | 40.000 | |
| | $K_x$ | −20.0000 | | | |
| | AR | $1.9117 \times 10^{-6}$ | | | |
| | BR | $-8.7696 \times 10^{-10}$ | | | |
| | AP | $-7.5555 \times 10^{-1}$ | | | |
| | BP | −1.2220 | | | |
| 4 | 68.114 | | | 1.5163 | 64.15 |
| | | | Y | −7.666 θ | 30.00° |
| | | | Z | 24.886 | |
| 5 | $R_y$ | −150.750 | | 1.5163 | 64.15 |
| | $R_x$ | −87.182 | Y | 20.418 θ | 31.28° |
| | $K_y$ | −79.4956 | Z | 32.891 | |
| | $K_x$ | −334.5455 | | | |
| | AR | $8.5541 \times 10^{-7}$ | | | |
| | BR | $-1.7073 \times 10^{-10}$ | | | |
| | AP | $4.0595 \times 10^{-1}$ | | | |
| | BP | $8.1476 \times 10^{-2}$ | | | |
| | 45.311 | | Y | 30.000 θ | 67.19° |
| | | | Z | 44.886 | |
| 7 | (display device) | | Y | −36.353 θ | 60.00° |
| | | | Z | 51.966 | |

FIGS. 11 to 13 graphically show lateral aberrations in Example 1 among the above-described Examples 1 to 10. In these aberrational diagrams, the parenthesized numerals denote (horizontal field angle, and vertical field angle), and lateral aberrations at the field angles are shown.

Although in the above-described examples anamorphic surfaces, spherical surfaces and flat surfaces are used for the constituent surfaces, it should be noted that these surfaces may have other surface configurations, e.g. toric surfaces, rotationally symmetric aspherical and spherical surfaces, and free curved surfaces defined by the expression (14). It is also possible to use holographic surfaces for the constituent surfaces.

In the case of a surface configuration for which curvature, power, etc. cannot be defined, the curvature, power, etc. of the surface may be obtained by determining the curvature in an arbitrary region which is obtained from the differential of the configuration of a portion of the surface at the intersection between the surface and axial light rays extending on the visual axis to reach the image display device, along the axial light rays, and defining the obtained curvature as the curvature of that surface.

Incidentally, it is possible to form a portable image display apparatus, such as a stationary or head-mounted image display apparatus, which enables the observer to see with both eyes, by preparing a combination of an image display device and an ocular optical system according to the present invention, arranged as described above, for each of the left and right eyes, and supporting the two combinations apart from each other by the interpupillary distance, that is, the distance between the eyes. It should be noted that it is also possible to form an image display apparatus for a single eye in which an ocular optical system according to the present invention is disposed for a single eye of the observer.

Figure 17A:
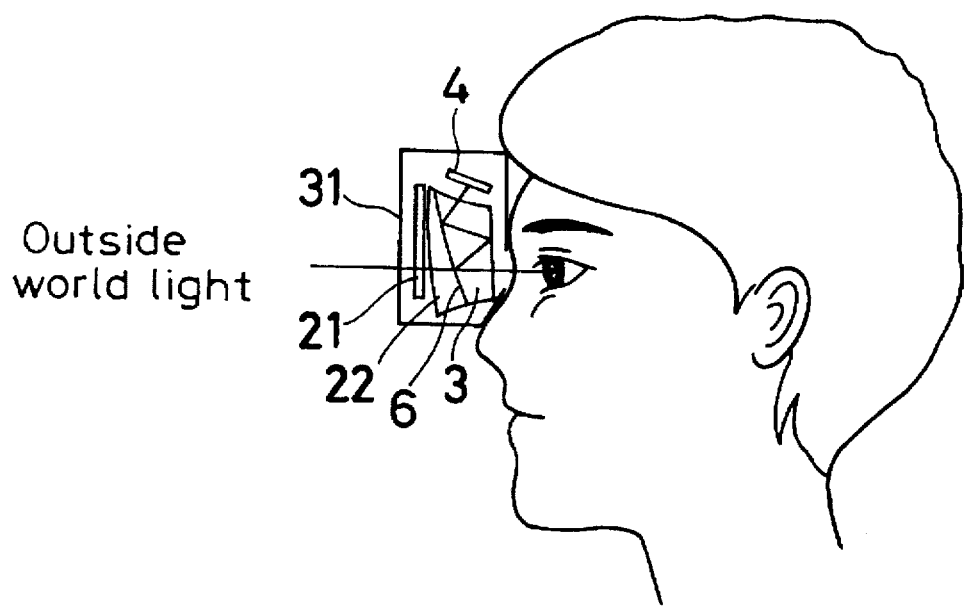
FIGS. 17(a) and 17(b) are sectional and perspective views showing a head-mounted image display apparatus according to the present invention.
Figure 17B:
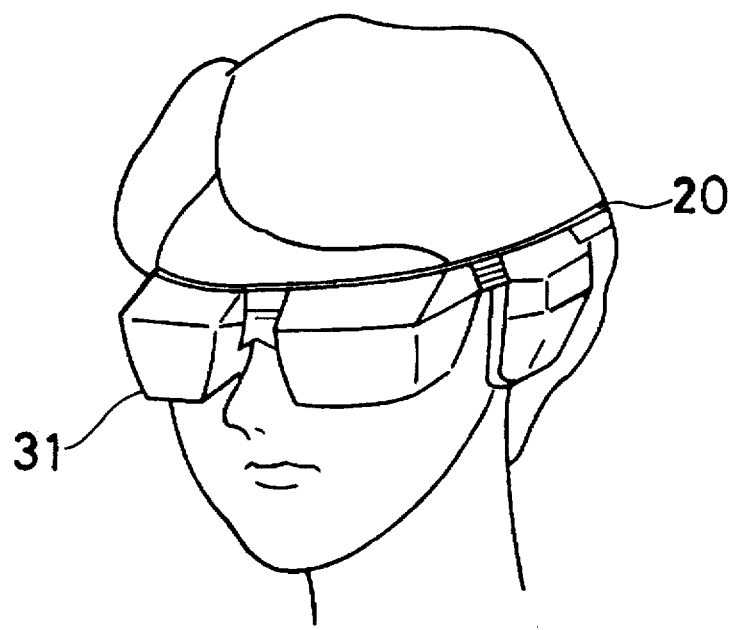

To arrange the image display apparatus of the present invention as a head-mounted image display apparatus (HMD) 31, as shown in the sectional view of FIG. 17(a) and the perspective view of FIG. 17(b), the HMD 31 is fitted to the observer's head by using a headband 20, for example, which is attached to the HMD 31. In this example of use, the HMD 31 may be arranged such that the second surface 6 of the ocular optical system 3 is formed by using a semitransparent mirror (half-mirror), and a see-through compensating optical system 22 and a liquid crystal shutter 21 are provided in front of the half-mirror, thereby enabling an outside world image to be selectively observed or superimposed on the image of the image display device 4. In this case, the see-through compensating optical system 22 comprises a transparent prism member which has been set so that the power of the entire optical system is approximately zero with respect to light from the outside world.

Figure 18:
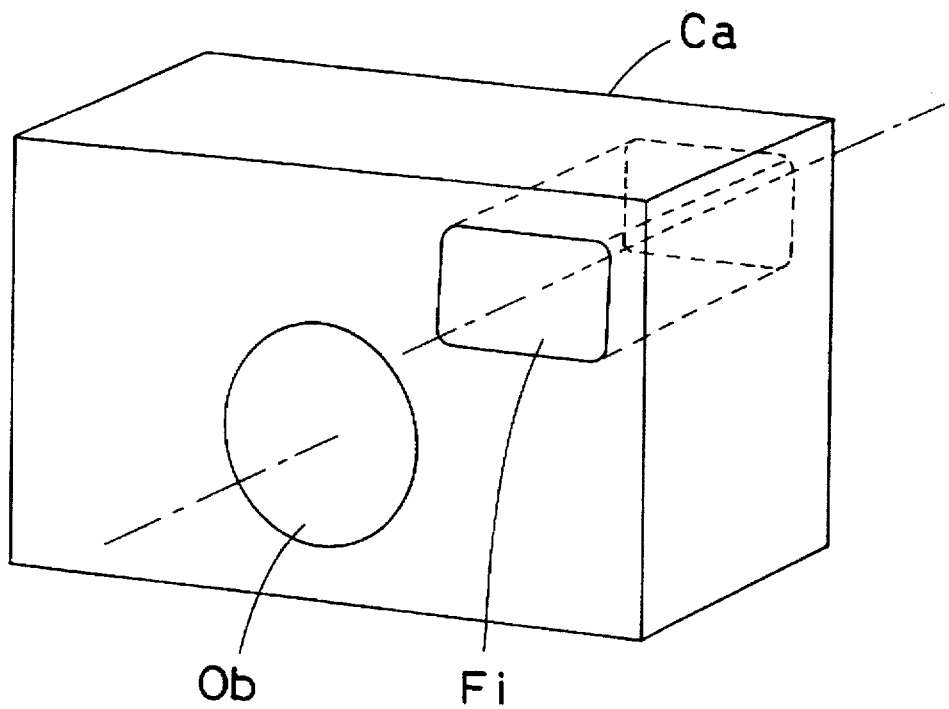
FIG. 18 shows an arrangement of an optical system according to the present invention as it is used as an imaging optical system.
Figure 19:
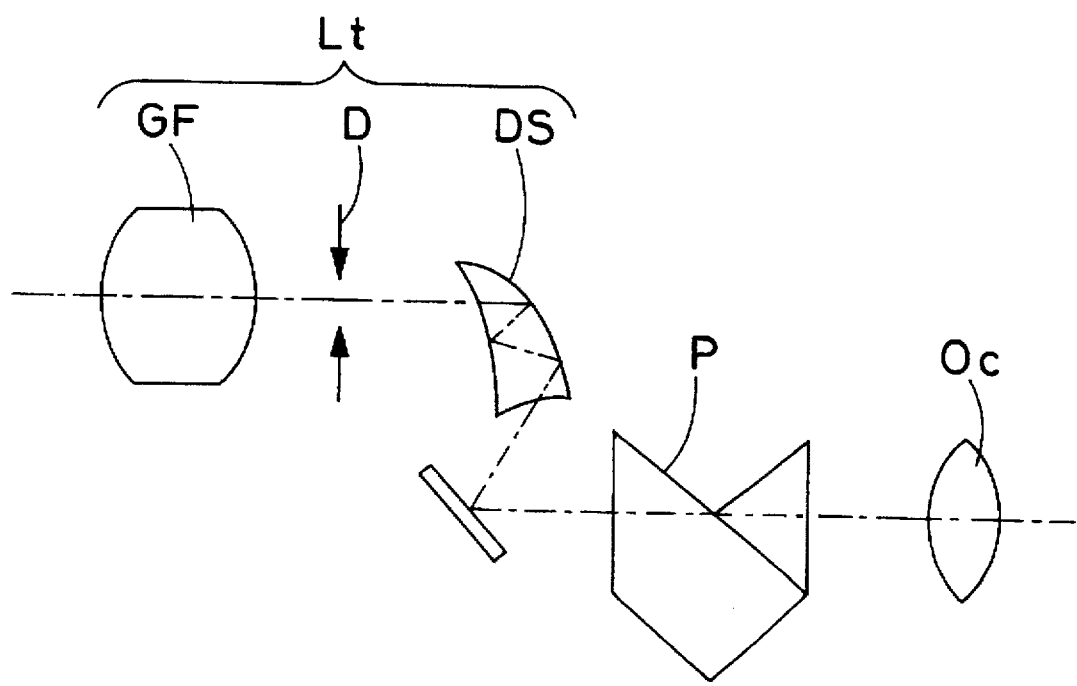
FIG. 19 shows an arrangement of an optical system according to the present invention as it is used as an imaging optical system.

Further, the ocular optical system of the image display apparatus according to the present invention can be used as an imaging optical system. For example, as shown in the perspective view of FIG. 18, the ocular optical system may be used in a finder optical system $F_i$ of a compact camera $C_a$ in which a photographic optical system $O_p$ and the finder optical system $F_i$ are provided separately in parallel to each other. FIG. 19 shows the arrangement of an optical system in a case where the ocular optical system according to the present invention is used as such an imaging optical system. As illustrated, an ocular optical system DS according to the present invention is disposed behind a front lens group GF and an aperture diaphragm D, thereby constituting an objective optical system $L_r$. An image that is formed by the objective optical system $L_r$ is erected by a Porro prism P, in which there are four reflections, provided at the observer side of the objective optical system $L_r$, thereby enabling an erect image to be observed through an ocular lens $O_c$.

Although the image display apparatus according to the present invention has been described by way of examples, it should be noted that the present invention is not necessarily limited to these examples and that various changes and modifications may be imparted thereto.

As will be clear from the foregoing description, the image display apparatus according to the present invention makes it possible to provide an image display apparatus which has a wide field angle for observation and is extremely small in size and light in weight.

What we claim is:

1. An image display apparatus comprising an image display device for displaying an image, and an ocular optical system for projecting the image formed by said image display device and for leading the projected image to an observer's eyeball,
    said ocular optical system being arranged such that light rays emitted from said image display device are reflected three or higher odd-numbered times before reaching said observer's eyeball, and that a surface of said ocular optical system that is disposed immediately in front of said observer's eyeball is a refracting surface which internally reflects the light rays, and through which the light rays exit from said ocular optical system.

2. An image display apparatus comprising an image display device for displaying an image, and an ocular optical system for projecting the image formed by said image display device and for leading the projected image to an observer's eyeball,
    said ocular optical system being arranged such that light rays emitted from said image display device are reflected three times before reaching said observer's eyeball, and that a surface of said ocular optical system that is disposed immediately in front of said observer's eyeball is a refracting surface which internally reflects the light rays, and through which the light rays exit from said ocular optical system.

3. An image display apparatus comprising an image display device for displaying an image, and an ocular optical system for projecting the image formed by said image display device and for leading the projected image to an observer's eyeball,
    said ocular optical system having at least three surfaces, wherein a space formed by said at least three surfaces is filled with a medium having a refractive index larger than 1,
    said at least three surfaces including, in an order in which light rays pass in backward ray tracing from said observer's eyeball to said image display device, a first surface which functions as both a refracting surface and an internally reflecting surface, a second surface which is a reflecting surface facing said first surface and decentered or tilted with respect to an observer's visual axis, and a third surface which is a refracting surface closest to said image display device, so that reflection takes place three times in a path from said observer's eyeball to said image display device.

4. An image display apparatus comprising an image display device for displaying an image, and an ocular optical system for projecting the image formed by said image display device and for leading the projected image to an observer's eyeball,
    said ocular optical system having at least four surfaces, wherein a space formed by said at least four surfaces is filled with a medium having a refractive index larger than 1,
    said at least four surfaces including, in an order in which light rays pass in backward ray tracing from said observer's eyeball to said image display device, a first surface which functions as both a refracting surface and an internally reflecting surface, a second surface which is a reflecting surface facing said first surface and decentered or tilted with respect to an observer's visual axis, a third surface which is a reflecting surface facing said first surface and adjacent to said second surface, and a fourth surface which is a refracting surface closest to said image display device, so that reflection takes place three times in a path from said observer's eyeball to said image display device.

5. An image display apparatus according to any one of claims 1 to 4, wherein at least one of the surfaces constituting said ocular optical system is a flat surface.

6. An image display apparatus according to claim 3 or 4, wherein the internal reflection at said first surface is total reflection.

7. An image display apparatus according to any one of claims 3 or 4, wherein said second surface is a reflecting surface which is concave toward said first surface.

8. An image display apparatus according to any one of claims 3 or 4, wherein said first surface is a surface which functions as both a transmitting surface and a reflecting surface, said first surface being convex toward said second surface.

9. An image display apparatus according to any one of claims 3 or 4, wherein said first surface is a flat surface which functions as both a transmitting surface and a reflecting surface.

10. An image display apparatus according to claim 3 or 4, wherein an internally reflecting region of said first surface has a reflective coating.

11. An image display apparatus according to claim 3 or 4 wherein said first surface is a surface which functions as both a transmitting surface and a reflecting surface, said first surface being concave toward said second surface.

12. An image display apparatus according to claim 3 or 4, wherein said second surface is a reflecting surface which is convex toward said first surface.

13. An image display apparatus according to claim 3 or 4, which satisfies the following condition:

$$0° < \theta_2 < 50° \quad (1)$$

where $\theta_2$ is an incident angle of an axial principal ray at a first reflection by said second surface in the backward ray tracing.

14. An image display apparatus according to claim 3 or 4, which satisfies the following condition:

$$10° < \theta_2 < 40° \quad (2)$$

where $\theta_2$ is an incident angle of an axial principal ray at a first reflection by said second surface in the backward ray tracing.

15. An image display apparatus according to claim 3 or 4, which satisfies the following condition:

$$-20° < \theta_1 < 40° \quad (3)$$

where $\theta_1$ is an incident angle of an axial principal ray at said first surface.

16. An image display apparatus according to claim 3 or 4, which satisfies the following condition:

$$-10° < \theta_1 < 25° \quad (4)$$

where $\theta_1$ is an incident angle of an axial principal ray at said first surface.

17. An image display apparatus according to claim 3 or 4, which satisfies the following condition:

$$20° < \theta_3 < 70° \quad (5)$$

where $\theta_3$ is an incident angle of an axial principal ray at internal reflection by said first surface.

18. An image display apparatus according to claim 3 or 4, which satisfies the following condition:

$$30° < \theta_3 < 55° \quad (6)$$

where $\theta_3$ is an incident angle of an axial principal ray at internal reflection by said first surface.

19. An image display apparatus according to claim 3 or 4, which satisfies the following condition:

$$20° < \theta_4 < 80° \quad (7)$$

where $\theta_4$ is an incident angle of an axial principal ray when reflected for a second time in the backward ray tracing by said second surface of said ocular optical system comprising three surfaces, or $\theta_4$ is an incident angle of an axial principal ray at said third surface of said ocular optical system comprising four surfaces.

20. An image display apparatus according to claim 3 or 4, which satisfies the following condition:

$$30° < \theta_4 < 65° \quad (8)$$

where $\theta_4$ is an incident angle of an axial principal ray when reflected for a second time in the backward ray tracing by said second surface of said ocular optical system comprising three surfaces, or $\theta_4$ is an incident angle of an axial principal ray at said third surface of said ocular optical system comprising four surfaces.

21. An image display apparatus according to claim 3 or 4, which satisfies the following condition:

$$-30° < \theta_5 < 40° \quad (9)$$

where $\theta_5$ is an incident angle of an axial principal ray at said third surface in said ocular optical system comprising three surfaces, or $\theta_5$ is an incident angle of an axial principal ray at said fourth surface in said ocular optical system comprising four surfaces.

22. An image display apparatus according to claim 3 or 4, which satisfies the following condition:

$$-40° < \theta_i < 40° \quad (10)$$

where $\theta_i$ is an incident angle of an axial principal ray at a display surface of said image display device.

23. An image display apparatus according to claim 3 or 4, which satisfies the following condition:

$$-25° < \theta_i < 25° \quad (11)$$

where $\theta_i$ is an incident angle of an axial principal ray at a display surface of said image display device.

24. An image display apparatus according to claim 3 or 4, which satisfies the following condition:

$$1.45 < N_d < 2.0 \quad (12)$$

where $N_d$ is a refractive index for the spectral d-line of said medium having a refractive index larger than 1.

25. An image display apparatus according to claim 3 or 4, which satisfies the following condition:

$$1.5 < N_d < 2.0 \quad (13)$$

where $N_d$ is a refractive index for the spectral d-line of said medium having a refractive index larger than 1.

26. An image display apparatus according to any one of claims 1 to 4, wherein at least one of the surfaces constituting said ocular optical system is an aspherical surface.

27. An image display apparatus according to claim 26, wherein at least one of the surfaces constituting said ocular optical system is an anamorphic surface.

28. An image display apparatus according to claim 26, wherein at least one of the surfaces constituting said ocular optical system is a free curved surface.

29. An image display apparatus according to claim 3 or 4, wherein a display surface of said image display device is tilted with respect to an axial principal ray.

30. An image display apparatus according to claim 29, wherein said image display device is disposed in such a manner that a side thereof which is reverse to said display surface faces said observer.

31. An image display apparatus according to any one of claims 1 to 4, further comprising means for positioning both said image display device and said ocular optical system with respect to the observer's head.

32. An image display apparatus according to any one of claims 1 to 4, further comprising means for supporting both said image display device and said ocular optical system with respect to the observer's head.

33. An image display apparatus according to any one of claims 1 to 4, further comprising means for supporting at least a pair of said image display apparatuses at a predetermined spacing.

34. An image display apparatus according to any one of claims 1 to 4, wherein said ocular optical system is used as an imaging optical system.

* * * * *